(12) United States Patent
Sakaniwa

(10) Patent No.: US 8,036,363 B2
(45) Date of Patent: Oct. 11, 2011

(54) COMMUNICATION TERMINAL APPARATUS, COMMUNICATION METHOD, AND RECORDING MEDIUM FOR ESTABLISHING COMMUNICATIONS WITH A PLURALITY OF PERSONS IN A PLURALITY OF COMMUNICATION MANNERS

(75) Inventor: Hidenori Sakaniwa, Kanagawa (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 1188 days.

(21) Appl. No.: 11/801,438

(22) Filed: May 10, 2007

(65) Prior Publication Data
US 2007/0275737 A1    Nov. 29, 2007

(30) Foreign Application Priority Data
May 12, 2006    (JP) .................................. 2006-134441

(51) Int. Cl.
*H04M 3/42*    (2006.01)
(52) U.S. Cl. ................... 379/211.04; 455/417; 455/461; 379/201.01; 379/201.04; 379/201.03
(58) Field of Classification Search ............. 379/211.04, 379/216, 201.01, 201.03; 455/417, 461
See application file for complete search history.

(56) References Cited

U.S. PATENT DOCUMENTS

| | | | |
|---|---|---|---|
| 5,239,684 A * | 8/1993 | Ishikura | 455/67.7 |
| 6,351,655 B1 | 2/2002 | Tsuji et al. | |
| 6,728,360 B1 * | 4/2004 | Brennan | 379/211.04 |
| 6,799,017 B1 * | 9/2004 | Kregel | 455/70 |
| 6,816,582 B2 * | 11/2004 | Levine et al. | 379/211.04 |
| 7,606,570 B2 * | 10/2009 | Karaoguz et al. | 455/442 |
| 7,742,590 B2 * | 6/2010 | Simpson | 379/211.01 |
| 2004/0192248 A1 * | 9/2004 | Chen | 254/131 |
| 2007/0154004 A1 * | 7/2007 | Daigle | 164/338.1 |

FOREIGN PATENT DOCUMENTS

| | | |
|---|---|---|
| JP | 08-237742 | 9/1996 |
| JP | 11-215224 | 8/1999 |
| JP | 11-313149 | 11/1999 |
| JP | 2001-086221 | 3/2001 |
| JP | 2002-094615 | 3/2002 |
| JP | 2003-188978 | 7/2003 |

OTHER PUBLICATIONS

Japanese Office Action dated May 7, 2008 (with English translation) issued for the counterpart Japanese Patent Application No. 2006-134441.

* cited by examiner

*Primary Examiner* — Davetta Goins
*Assistant Examiner* — Phan Le
(74) *Attorney, Agent, or Firm* — Cozen O'Connor

(57) ABSTRACT

A communication processing unit includes communication processing units which use different communication manners. A user interface unit receives input of information indicating a calling destination from a user. An information storage unit stores a person to contact and plural phone numbers of that person in association. When a person to contact is input to the user interface unit, a control unit acquires a phone number associated with the input person, and information indicating a communication manner to be used from the information storage unit, and controls the communication processing unit to make a call to the acquired phone number in the acquired communication manner. If the person to contact has plural phone numbers, the control unit controls the communication processing unit to make calls to these phone numbers in parallel.

16 Claims, 11 Drawing Sheets

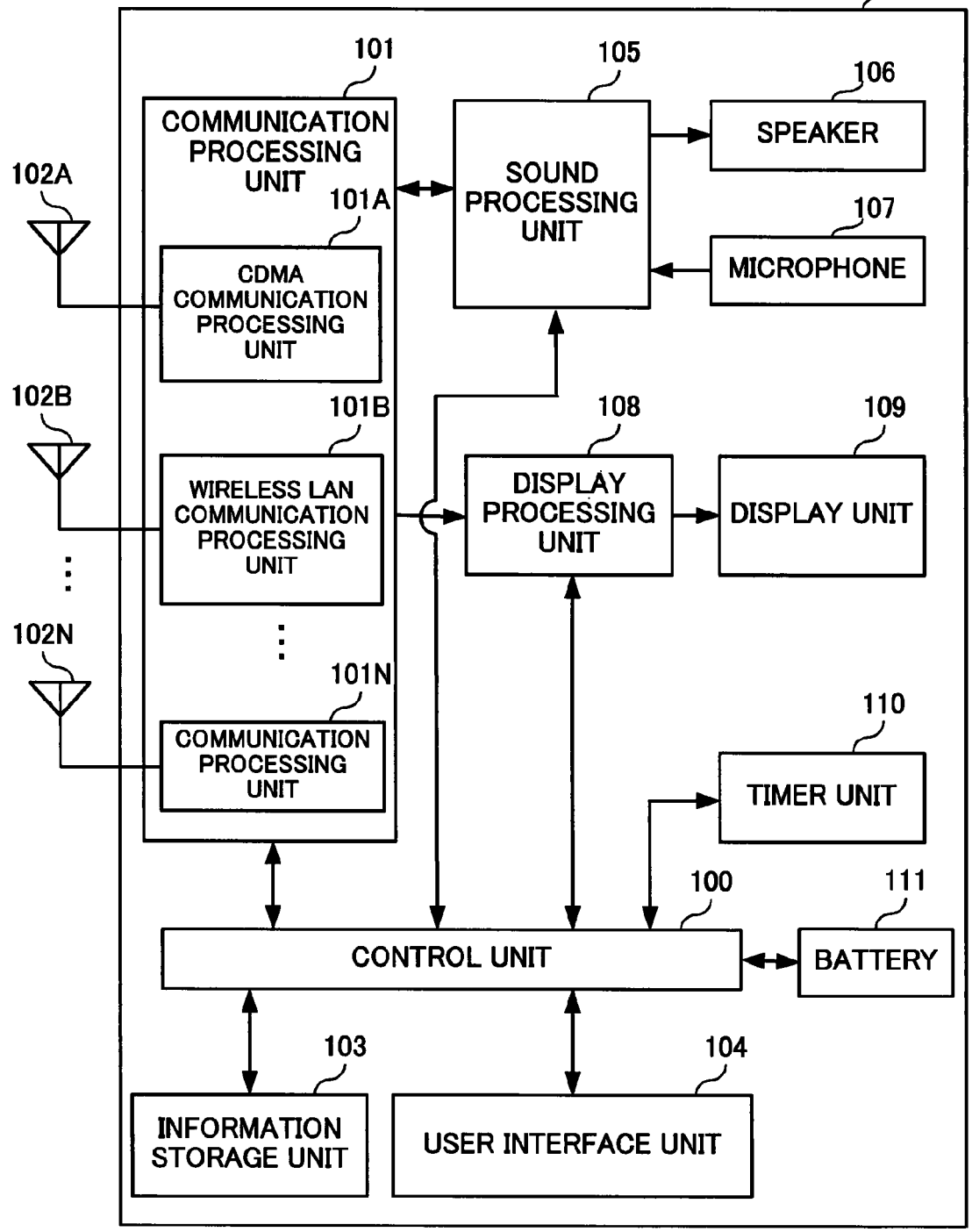

201

| NAME | ID INFORMATION | TYPE | COMMUNICATION MANNER | ... |
|---|---|---|---|---|
| TARO YAMADA | ○○○-○○○-○○○○ | MOBILE PHONE | CDMA | ... |
| | △△△-△△△-△△△△ | HOME | WIRELESS LAN | ... |
| | ×××-×××-×××× | COMPANY | EV-DO | ... |

| NAME | ID INFORMATION | TYPE | COMMUNICATION MANNER | CALL MAKING SETTING | RECEPTION TIME |
|---|---|---|---|---|---|
| HANAKO | ○○○-×××-△△△△ | MOBILE PHONE | CDMA | 1 | * |
| | △△△-○○○-×××× | HOME | WIRELESS LAN | 1 | * |
| FAMILY | ○○○-△△△-▽▽▽▽ | MOBILE PHONE | CDMA | 1 | * |
| | △△△-×××-▽▽▽▽ | HOME | WIRELESS LAN | 1 | 21:00-6:00 |
| | ×××-○○○-△△△△ | COMPANY | EV-DO | 0 | 9:00-20:00 |
| ICHIRO | ○○○-▽▽▽-×××× | MOBILE PHONE | CDMA | 1 | * |
| | △△△-▽▽▽-○○○○ | HOME | WIRELESS LAN | 1 | * |
| | ×××-△△△-○○○○ | COMPANY | EV-DO | 0 | 8:00-19:00 |
| ⋮ | ⋮ | ⋮ | ⋮ | ⋮ | ⋮ |

FIG.3B

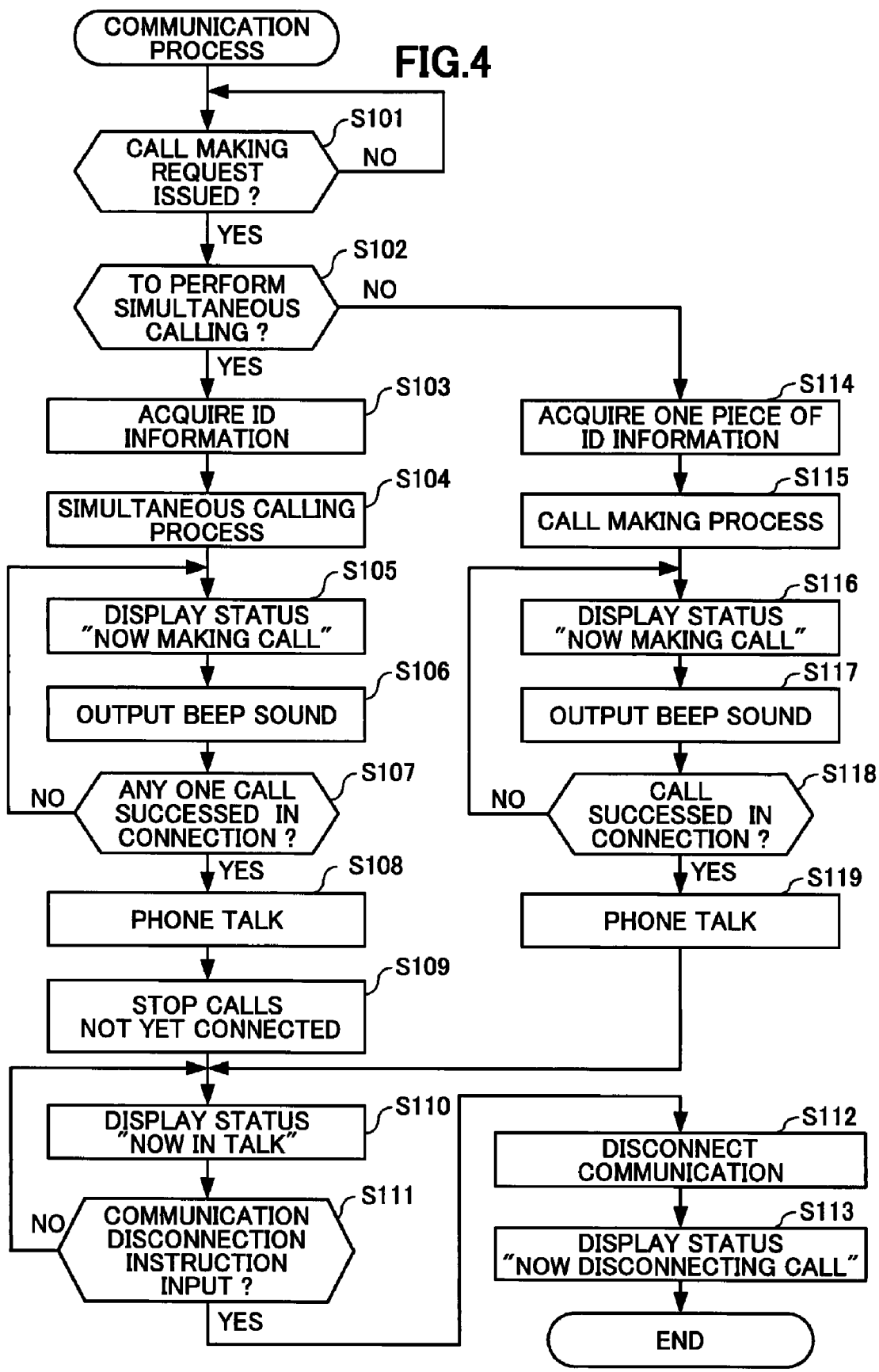

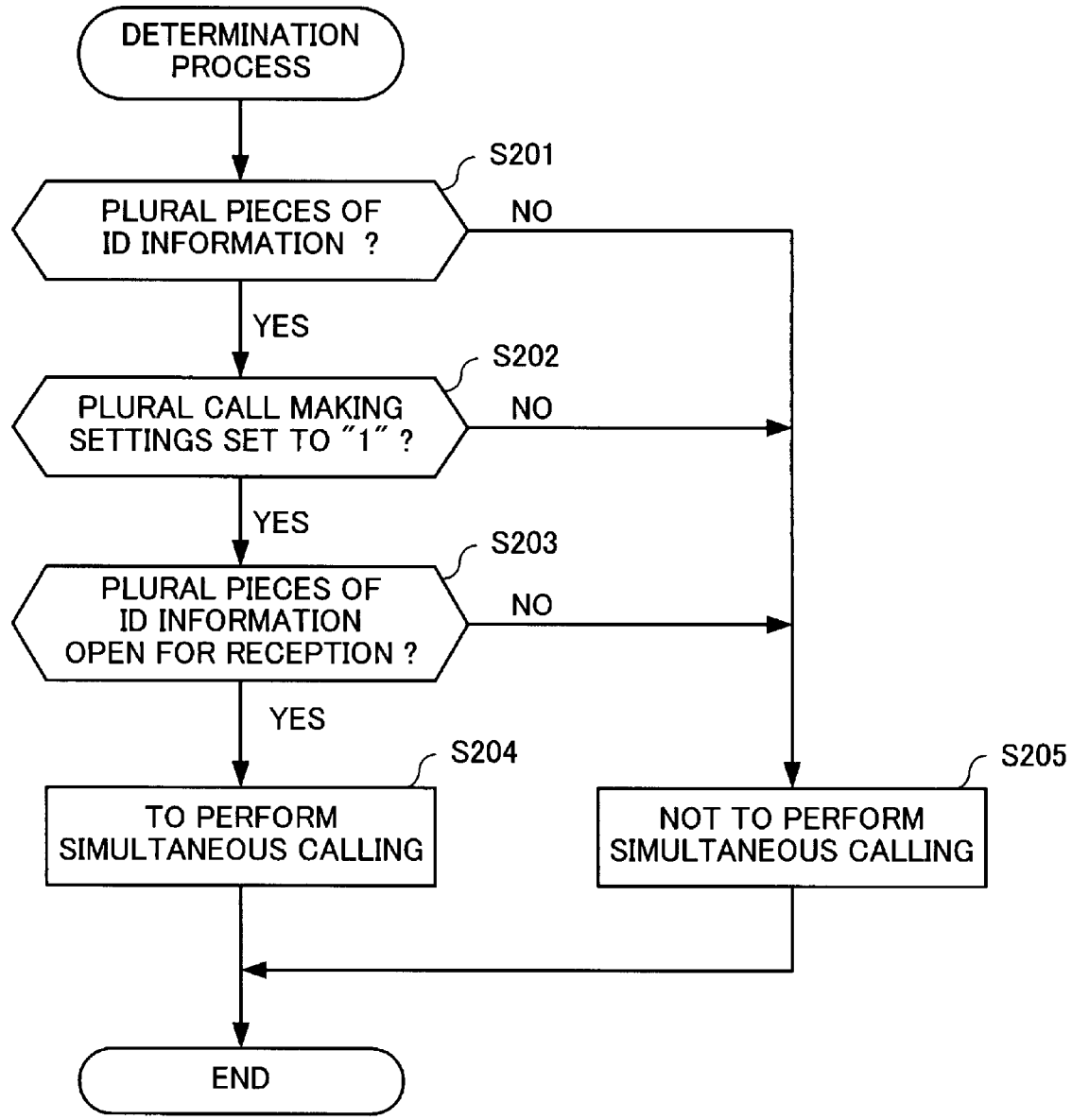

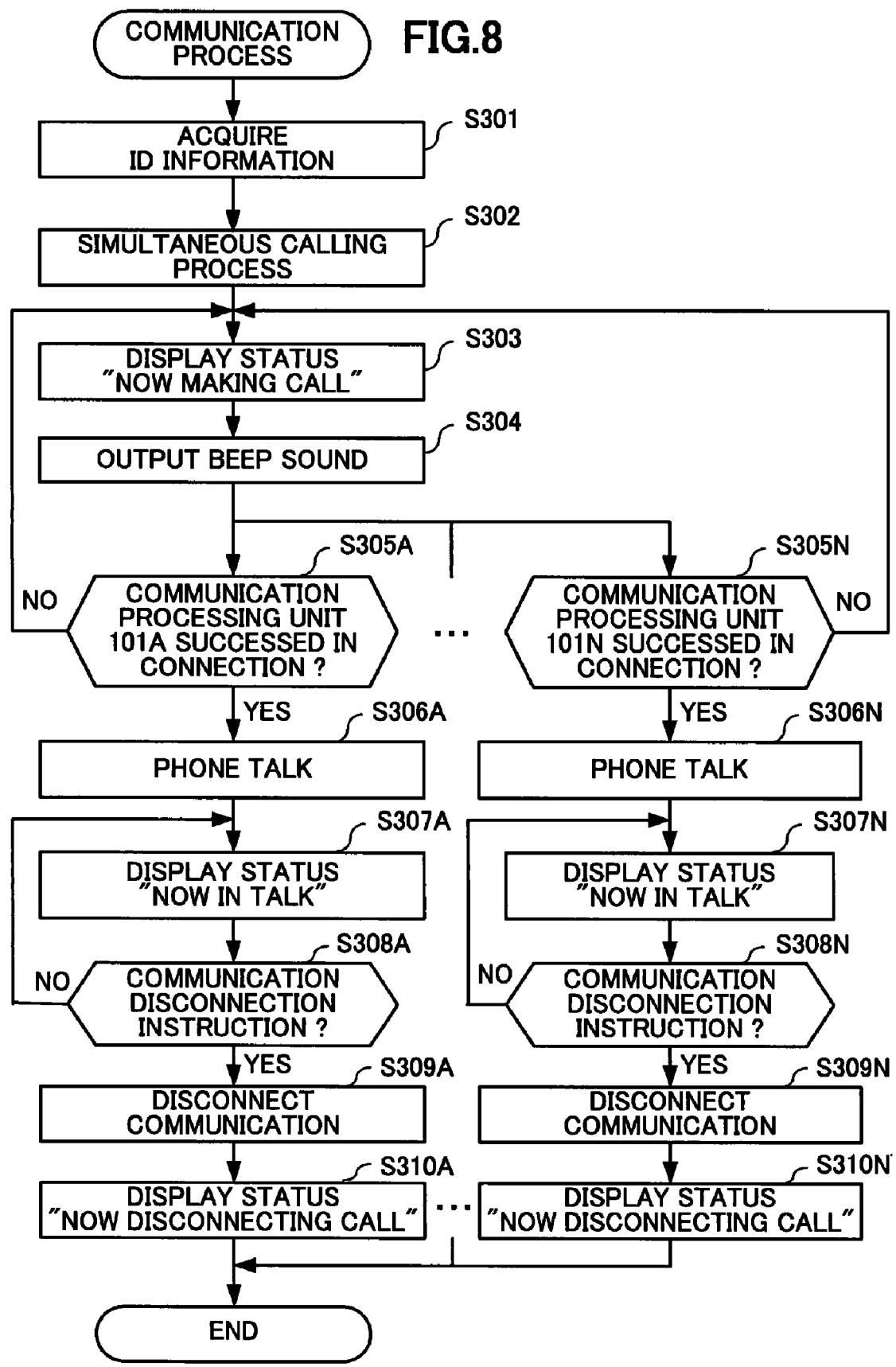

COMMUNICATION TERMINAL APPARATUS, COMMUNICATION METHOD, AND RECORDING MEDIUM FOR ESTABLISHING COMMUNICATIONS WITH A PLURALITY OF PERSONS IN A PLURALITY OF COMMUNICATION MANNERS

BACKGROUND OF THE INVENTION

1. Field of the Invention

The present invention relates to a communication terminal apparatus, a communication method, and a recording medium.

2. Description of the Related Art

Portable terminals are widespread as a communication terminal apparatus. For example, in a case where someone wants to get in touch with a family member from outside the home, he/she first calls the land phone of the house and then calls the mobile hone of the family member if no one answers the call, or reversely, calls the mobile hone of the family member and then calls the land phone of the house if not connected to the family member. In this case, it is necessary to make calls plural times to plural destinations, requiring a long time to get in touch.

Unexamined Japanese Patent Application KOKAI Publication No. H8-237742 discloses a scheme that enables a person, who uses a mobile phone which can be used anywhere, his/her home, his/her workplace, or outdoors, to be exempted from having to make calls plural times, wherever the mobile phone exists, the person's home, workplace, or outdoors. According to this scheme, a mobile phone terminal at the receiver side switches its communication modes among home use, business use, and outdoors use, for which different phone numbers are prepared, and notifies and registers the switched and now set communication mode to a mobile phone system control device connected to a public network. Then, when a phone call is made to the phone number of the communication mode that is not registered, the mobile phone system control device transfers the phone call to the phone number of the communication mode registered, so that the mobile phone terminal at the receiver side receives the phone call by the set communication mode.

In exchanging urgent information, it is crucial for both the calling side and the receiving side to be able to start a phone talk quickly. In this case, if the communication partner has phone numbers for plural destinations, it is often not possible to easily know the present whereabouts of the partner. Therefore, thinking which phone number of the partner to call to start a phone talk most effectively takes labor and extra minutes and imposes a great load on the user. Further, when the user fails in his/her prediction and cannot be connected to the partner, he/she has to again make a call to another phone number, causing a delay in making an urgent contact.

Further, according to the above-described prior art, in addition to the mobile phone terminal having a plurality of communication modes, the mobile phone system control device is necessary, additionally requiring costs for installation. Further, it is necessary to switch the communication modes of the mobile phone terminal according to where the terminal is used and notify the switching of the communication modes to the mobile phone system control device via a public network every time the modes are switched, requiring a lot of labor.

SUMMARY OF THE INVENTION

The present invention was made in view of the above-described circumstance, and an object of the present invention is to provide a communication terminal apparatus, a communication method, and a recording medium which are suitable for quickly establishing communications with a plurality of persons in a plurality of communication manners.

To achieve the above object, a communication terminal apparatus according to a first aspect of the present invention comprises:

a first communication unit which performs communication in a predetermined first communication manner;

a second communication unit which performs communication in a predetermined second communication manner different from the first communication manner;

a storage unit which stores identification information for specifying a communication destination, in association with a person to communicate with; and a communication control unit which, in a case where the person to communicate with has a plurality of communication destinations, reads out identification information of a first communication destination of the person to communicate with and identification information of a second communication destination of the person to communicate with, that is different from the first communication destination, from the storage unit when communication with the person to communicate with is to be carried out, and controls the first communication unit to send a communication request call by using the read-out identification information of the first communication destination and controls the second communication unit to send a communication request call by using the read-out identification information of the second communication destination in parallel with sending of the communication request call by the first communication unit.

A communication method according to a second aspect of the present invention comprises:

a reception step of receiving an instruction input for starting communication with a person to communicate with;

a reading step of, when a instruction input for starting communication is received at the reception step, reading out identification information of a first communication destination of the person to communicate with and identification information of a second communication destination of the person to communicate with that is different from the first communication destination, from a storage unit which prestores information indicating a plurality of communication destinations of the person to communicate with; and a communication controlling step of controlling a communication request call to be sent to the first communication destination read out at the reading step with use of a predetermined first communication manner, and in parallel with sending of the communication request call by the first communication manner, controlling a communication request call to be sent to the second communication destination read out at the reading step with use of a second communication manner different from the first communication manner.

An information recording medium according to a third aspect of the present invention stores a program for controlling a computer to function as:

a first communication unit which performs communication in a predetermined first communication manner;

a second communication unit which performs communication in a predetermined second communication manner different from the first communication manner;

a storage unit which stores identification information for specifying a communication destination, in association with a person to communicate with; and a communication control unit which, in a case where the person to communicate with has a plurality of communication destinations, reads out identification information of a first communication destination of the person to communicate with and identification information of a second communication destination of the person to communicate with, that is different from the first communication destination from the storage unit when communication with the person to communicate with is to be carried out, and controls the first communication unit to send a communication request call by using the read-out identification information of the first communication destination and controls the second communication unit to send a communication request call by using the read-out identification information of the second communication destination in parallel with sending of the communication request call by the first communication unit.

BRIEF DESCRIPTION OF THE DRAWINGS

These objects and other objects and advantages of the present invention will become more apparent upon reading of the following detailed description and the accompanying drawings in which:

FIG. 2 is a block diagram showing an example of the structure of the communication terminal according to the first embodiment of the present invention;

FIGS. 3A and 3B are diagrams showing examples of information tables stored in an information storage unit;

FIG. 4 is a flowchart showing the flow of a communication process according to the first embodiment of the present invention;

FIG. 5 is a flowchart showing the flow of a simultaneous calling determination process;

FIG. 8 is a flowchart showing the flow of a communication process according to a second embodiment of the present invention;

DETAILED DESCRIPTION OF THE PREFERRED EMBODIMENTS

The embodiments of the present invention will be explained with reference to FIGS. 1 to 11.

First Embodiment

In the present embodiment, a communication terminal which can simultaneously call a plurality of communication destinations in a plurality of communication manners will be used.

Figure 1:
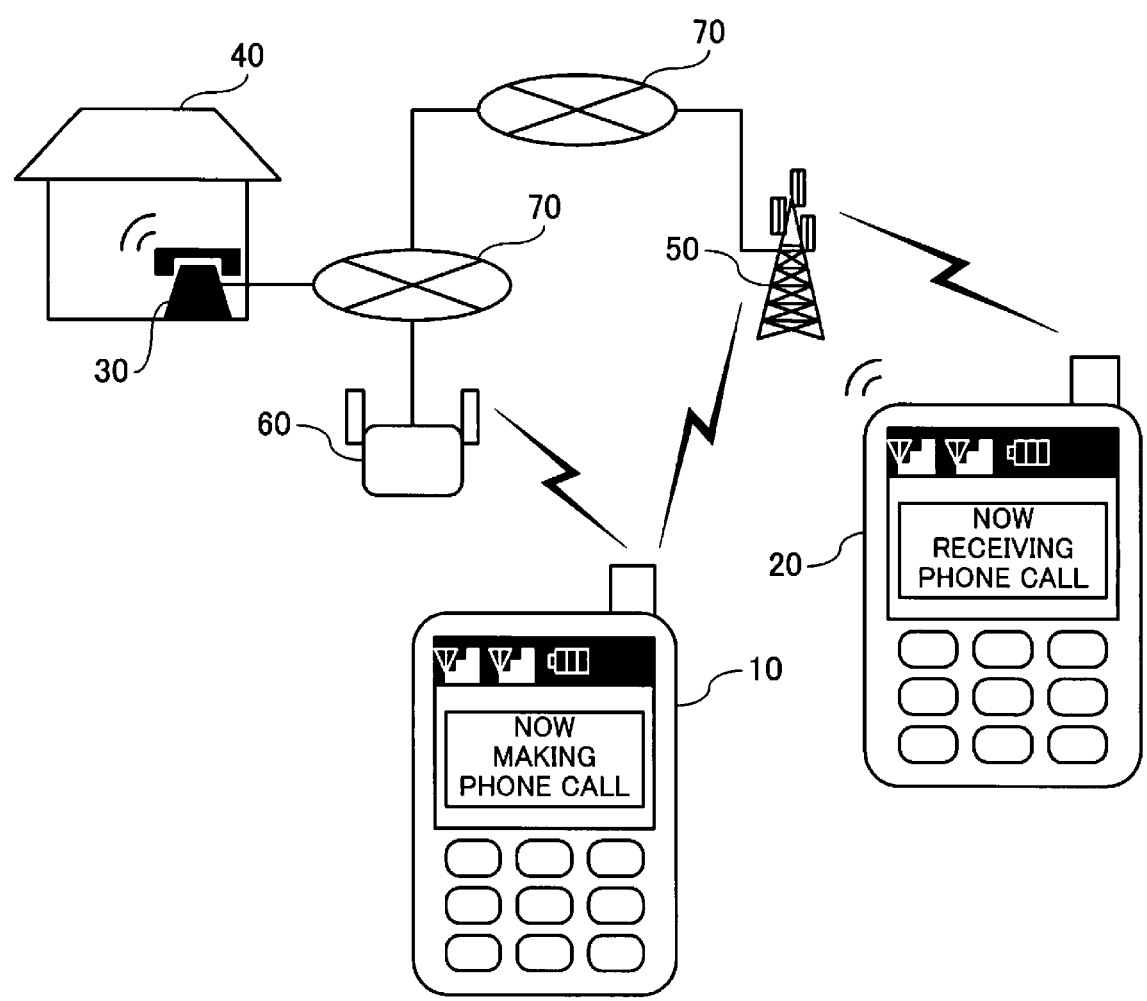
FIG. 1 is a diagram showing an example of the structure of a system using a communication terminal according to a first embodiment of the present invention.

FIG. 1 is a diagram showing an example of the structure of a system using the communication terminal according to the first embodiment of the present invention. With reference to this diagram, the outline of the communication system according to the resent embodiment will be explained.

A communication terminal 10 is a communication terminal such as a mobile phone, etc., which is owned by a person who is to make a phone call. Specifically, the communication terminal 10 can perform communications in a plurality of communication manners such as, for example, a CDMA (Code Division Multiple Access) manner, a wireless LAN (Local Area Network) manner, an EV-DO (Evolution Data Only) manner, etc.

A receiving terminal 20 is a communication terminal such as a mobile phone, etc., which is owned by a person who is to receive a phone call. The receiving terminal 20 can perform wireless communications in, for example, a CDMA manner.

A phone machine 30 is a phone machine installed in a house 40.

For example, the receiving person, who owns the receiving terminal 20, answers a call by the phone machine 30 when in home, and answers a call by the receiving terminal 20 when out.

A CDMA base station 50 is a base station which sends or receives radio waves to or from communication terminals in a CDMA manner.

A wireless LAN access point 60 is a relay device used in wireless communications performed in a wireless LAN manner.

A communication network 70 is a communication network such as a telephone line network, etc. The CDMA base station 50, the wireless LAN access point 60, and the phone machine 30 are connected to the communication network 70.

In performing communications in the CDMA manner, the communication terminal 10 owned by the calling person communicates with the receiving terminal 20 or the phone machine 30 through the CDMA base station 50 and the communication network 70. In performing communications in the wireless LAN manner, the communication terminal 10 communicates with the receiving terminal 20 or the phone machine 30 through the wireless LAN access point 60 and the communication network 70.

The calling person generally wants to get connected to the person who is being called in one operation, in a case where he/she is to exchange urgent information. Hence, the communication terminal 10 according to the present embodiment can simultaneously make phone calls to a plurality of phone numbers by using a plurality of communication functions in response to one call making operation by the calling person, to enable quick establishment of communication with the receiving person.

Specifically, when the calling person performs a predetermined operation for calling the person to contact (communication partner) by using the communication terminal 10, the communication terminal 10 determines whether or not the person to contact has a plurality of phone numbers, and if does, calls these phone numbers simultaneously. In the following explanation, "to call simultaneously" means to start processes for establishing communications with different connection destinations in different communication manners at almost the same timing in parallel.

For example, in a case where the person to contact is a receiving person who answers a phone call by the receiving terminal 20 or the phone machine 30, the communication terminal 10 makes a call to the CDMA base station 50 and a call to the wireless LAN access point 60 simultaneously in parallel. Then, the CDMA base station 50 performs a process for calling the receiving terminal 20 based on phone number registration information. On the other hand, the wireless LAN access point 60 performs a process for calling the phone machine 30 based on phone number registration information. Thereby, the calls simultaneously reach the calling destinations of different phone numbers in one calling operation. The person to contact can answer the call by the receiving terminal 20 when, for example, he/she is out, or by the phone machine 30 when in home.

Hence, with the communication terminal 10 according to the present embodiment, it is possible to establish communication with the person to contact quickly with no need to transfer the phone call, even if it is unknown where the person to contact is.

Next, the structure of the communication terminal 10 will be explained.

FIG. 2 is a block diagram showing an example of the structure of the communication terminal 10 according to the first embodiment of the present invention.

As illustrated, the communication terminal 10 comprises a control unit 100, a communication processing unit 101, antennas 102, an information storage unit 103, a user interface unit 104, a sound processing unit 105, a speaker 106, a microphone 107, a display processing unit 108, a display unit 109, a timer unit 110, and a battery 111.

The control unit 100 comprises a CPU (Central Processing Unit), a ROM (Read Only Memory), a RAM (Random Access Memory), etc., performs data calculations, and controls the entire communication terminal 10. Specifically, calculation processes and control processes are performed by the CPU executing a control program stored in the ROM while using the RAM as a work area to temporarily store data therein.

The process for quickly establishing communication with the communication partner, etc. are performed by the control unit 100 controlling each unit of the communication terminal 10 such as the communication processing unit 101, the information storage unit 103, the user interface unit 104, the sound processing unit 105, the display processing unit 108, the timer unit 110, etc. according to the program stored in the ROM, a later-described program stored in the information storage unit 103, etc.

The communication processing unit 101 can perform communications by using a plurality of communication manners such as CDMA, wireless LAN, EV-DO, etc. The communication processing unit 101 comprises an N number (N being a integer equal to or larger than 2) of communication processing units 101A, 101B, . . . , and 101N for different communication manners, such as a CDMA communication processing unit 101A for performing wireless communications in a CDMA manner, a wireless LAN communication processing unit 101B for performing wireless communications using a wireless LAN, etc. Hence, the communication processing unit 101 can communicate with a plurality of communication destinations in parallel, in a plurality of communication manners.

The antennas 102 send or receive radio waves in the plurality of communication manners. The antennas 102 include antennas 102A, 102B, . . . , and 102N for different communication manners respectively, which are connected to the CDMA communication processing unit 101A, the wireless LAN communication processing unit 101B, etc., respectively. Only one antenna may be shared among the different communication processing units. In a case where communications are through wired communication manners using a predetermined cable, or the like, no antenna is needed.

When a radio wave is received, the antennas 102A, 102B, . . . , and 102N convert the received radio wave into a reception signal and supply it to the corresponding communication processing units 101A, 101B, . . . , and 101N. The communication processing units 101A, 101B, . . . , and 101N convert the supplied reception signal into a coded sound signal.

When sending a radio wave, the communication processing units 101A, 101B, . . . , and 101N convert a coded sound signal into a sending signal matching their communication manner, and supply it to the antennas 102A, 102B, . . . , and 102N. The antennas 102A, 102B, . . . , and 102N convert the sending signal supplied from the communication processing units 101A, 101B, . . . , and 101N into a radio wave and radiate it.

The information storage unit 103 is a memory space for retaining data of a so-called address book generally used in mobile phones. For example, the information storage unit 103 is constituted by a flash memory or the like, and stores an owner information table 201 for storing the phone number of the communication terminal 10, etc., and a contact destination information table 202 for storing phone numbers of contact destinations (communication destinations) of communication partners, etc.

FIG. 3A is an example of the owner information table 201 for storing information on the owner of the communication terminal 10. As illustrated, the owner information table 201 stores the name of the owner and identification information of the communication terminal 10 in association with each other. The identification (ID) information is typically the phone number. For example, according to the owner information table 201 exemplified in FIG. 3A, "Taro Yamada", the owner of the communication terminal 10, can make calls by the communication terminal 10 using three phone numbers, and receive calls by the communication terminal 10 using the three phone numbers.

Further, the owner information table 201 stores type, communication manner, etc. in association with each ID information. The type is information indicating the classification of the ID information, and may be, for example, "mobile phone" indicating that the ID information is a phone number of a mobile phone, "home" indicating that the ID information is a phone number of the home, "company" indicating that the ID information is a phone number of a company, etc. These types are merely examples.

The communication manner is information indicating the communication manner to be used in performing communication from the phone number concerned. The owner information table 201 exemplified in the diagram shows settings that communication is performed in the CDMA communication manner when a first phone number 211 is used, communication is performed by using a wireless LAN when a second phone number 212 is used, and communication is performed by using EV-DO when a third phone number 213 is used. According to these settings, the CDMA communication processing unit 101A performs communication by using the first phone number 211 as the phone number of the calling person, and the wireless LAN communication processing unit 101B performs communication by using the second phone number 212 as the phone number of the calling person.

FIG. 3B is an example of the contact destination information table 202 for storing information of a contact destination of each communication partner. As illustrated, the contact destination information table 202 stores ID information (typically, phone number, subscriber's number, etc.), which is a contact destination of each communication partner, in association with the name of each communication partner. Based on the contact destination information table 202, the communication terminal 10 can communicate with a plurality of communication destinations in a plurality of communication manners. For example, in a case where to call "Hanako", the communication terminal 10 can simultaneously call a first phone number 221 and a second phone number 222 in different communication manners, based on the contact destination information table 202 exemplified in FIG. 3B.

Not only an individual's name, but a group name, etc. can be registered in the contact destination information table 202 as the name of the communication partner. For example, a group name "family" may be registered in the name section of a communication partner, and the phone numbers of the respective members of the family may be registered in the phone number section. The name may be any information that can specify the communication partner, and may be expressed by arbitrary characters, numerals, symbols, images, etc.

Further, the contact destination information table 202 stores type, communication manner, call making setting, reception time, etc. in association with each ID information.

The type is information indicating the classification of the ID information of the contact destination, and may be, for example, "mobile phone", "home", "company", etc.

The communication manner indicates the communication manner to be used in performing communication with the phone number concerned. The contact destination information table 202 exemplified in FIG. 3B shows that communication with the first phone number 221, which is one contact destination of "Hanako", is through the CDMA communication manner, and communication with the second phone number 222 is by using the wireless LAN.

The call making setting is setting information indicating whether or not the ID information of the calling destination is the object for which a later-described simultaneous calling process is performed, and is set by the owner beforehand. For example, "1" is set for the phone number, which is the object of the simultaneous calling process, and "0" is set for the phone number which is not the object of the simultaneous calling process.

The reception time is a period of time open for reception, set for each ID information. The contact destination information table 202 exemplified in FIG. 3B shows that no reception time is set for a first phone number 231, which is one contact destination of "family", a second phone number 232 is open for phone call reception from 21 o'clock to 6 o'clock, and a third phone number 233 is open for phone call reception from 9 o'clock to 20 o'clock.

In this way, the information storage unit 103 pre-stores ID information of the communication terminal 10 and information designating the communication manner in the owner information table 201, and a list of communication partners such as a so-called address book or the like in the contact destination information table 202. Further, the information storage unit 103 stores the call making setting of whether or not to perform simultaneous calling, information designating the communication manner to be used in calling a communication partner, etc. The information storage unit 103 further stores various other information than those described above, such as data and programs, etc.

The user interface unit 104 comprises alphanumeric keys for typing numerals and characters, a crosshair cursor key, buttons, etc., and is operated by the user of the communication terminal 10. The user interface unit 104 receives an input for instructing call making, call disconnecting, etc. from the user, or receives an input of information such as the phone number or e-mail address of the calling destination from the user and inputs the received information to the control unit 100.

The control unit 100 adds information to the information storage unit 103 or updates or deletes data already stored in the information storage unit 103, based on the information input from the user interface unit 104. When a call making request is input to the user interface unit 104 by the user, the control unit 100 controls the communication processing unit 101 to make a phone call based on the information stored in the information storage unit 103. Further, the control unit 100 can retrieve information stored in the information storage unit 103 or check information against the information in the information storage unit 103, based on information input from the user interface unit 104.

The sound processing unit 105 performs decoding, encoding, dynamic range adjustment, digital-analog conversion, etc. to constitute a path for transmitting an audio signal and a coded signal to the terminal of the communication partner, when communication is established by the communication processing unit 101.

Specifically, the sound processing unit 105 decodes a coded signal supplied from the communication processing unit 101, converts it into an analog signal to generate a sound signal, and supplies it to the speaker 106. Further, the sound processing unit 105 converts a sound signal supplied from the microphone 107 into a digital signal, encodes it to generate a coded signal, and supplies it to the communication processing unit 101.

The speaker 106 outputs a sound or a ring alert in voice communications, based on a sound signal supplied from the sound processing unit 105. The microphone 107 collects a voice, etc. of the user when taking over the phone, and supplies it as a sound signal to the sound processing unit 105. The user can talk over the phone through the speaker 106 and the microphone 107.

The display processing unit 108 performs a process for displaying a communication status on the display unit 109 based on information supplied from the communication processing unit 101. For example, the display processing unit 108 displays status "now making a call" on the display unit 109 when the communication processing unit 101 performs a call making process, "now in talk" on the display unit 109 when the communication processing unit 101 performs a phone talk process, or "now disconnecting the phone call" on the display unit 109 when the communication processing unit 101 performs a phone call disconnecting process.

The display processing unit 108 further controls processes for displaying various other information on the display unit 109. For example, the display processing unit 108 controls a process for displaying information of the address book stored in the information storage unit 103, a process for displaying the phone number of the communication partner when making a phone call or receiving a phone call, a process for displaying the battery remaining amount, etc.

The display unit 109 is a device that displays various information under the control of the display processing unit 108. The display unit 109 is a display device such as a liquid crystal display (LCD), an electroluminescence (EL) display, etc., widely used in mobile phones.

The timer unit 110 comprises a clock circuit or the like, and keeps the date and time.

The battery 111 is a source of power necessary to drive the communication terminal 10.

The user can input the name of the person to contact, the phone number of the contact destination, etc. beforehand, through the user interface unit 104. The input information is retained in the contact destination information table 202 of the information storage unit 103.

The user makes a phone call by selecting one phone call from the contact destination information stored in the contact destination information table 202 of the information storage unit 103 or by directly inputting the phone number from the user interface unit 104.

The communication status of the communication terminal 10 is displayed on the display unit 109 under the control of the display processing unit 108. When a voice communication is established, the sound processing unit 105 encodes voice information and applies processes such as dynamic range adjustment, etc. enabling the user to talk through the speaker 106 and the microphone 107.

As described above, the communication processing unit 101 of the communication terminal 10 can perform communication simultaneously in N kinds of communication manners. Hence, a communication process for quickly establishing communication with a communication partner will be explained.

FIG. 4 is a flowchart showing a communication process by the communication terminal 10 according to the present embodiment. This process is started when call making is requested by the user.

The user interface unit 104 receives a call making request from the user, and the control unit 100 determines whether or not any call making request has been issued (step S101). Specifically, the control unit 100 determines whether or not ID information designating a connection destination and a request for making a call to that connection destination have been input from the user interface unit 104. For example, the control unit 100 displays a list of names stored in the contact destination information table 202 on the display unit 109, and determines that a call making request has been issued when the user selects the name of a person whom the user wants to contact and presses a call button or the like for requesting a call to be made.

When no call making request has been issued (step S101; NO), the control unit 100 waits till a call making request is issued.

When a call making request is issued (step S101; YES), the control unit 100 determines whether or not to perform simultaneous calling to a plurality of communication destinations (step S102). Specifically, the control unit 100 checks the ID information designating the connection destination included in the call making request issued at step S101 against the information in the contact destination information table 202 in the information storage unit 103. Then, by determining (1) whether or not the person to call has plural pieces of ID information (e.g., phone numbers), (2) in a case where the person to call does, whether or not the call making settings indicate that simultaneous calling should be performed, etc., the control unit 100 determines whether or not there are plural pieces of ID information that are to be the object of the simultaneous calling process. Then, the control unit 100 determines to perform simultaneous calling in a case where there are plural pieces of ID information that are set to be the object of simultaneous calling, and determines not to perform simultaneous calling otherwise.

The determination process performed at step S102 will be explained in detailed. FIG. 5 is a flowchart showing the determination process.

First, the control unit 100 determines whether or not plural pieces of ID information are associated with the person to call (step S201). Specifically, the control unit 100 determines whether or not plural pieces of ID information (e.g., phone numbers) are associated with the name of the person to call included in the call making request of step S101 of FIG. 4 in the contact destination information table 202 in the information storage unit 103.

In a case where plural pieces of ID information are associated (step S201; YES), the control unit 100 determines whether these plural pieces of ID information include a plurality of them whose call making setting is effective (step S202). Specifically, the control unit 100 determines whether there are plural pieces of ID information whose call making setting is set to "1" indicating that the setting is effective, by referring to the contact destination information table 202 in the information storage unit 103.

In a case where there are plural pieces of ID information whose call making setting is effective (step S202; YES), the control unit 100 determines whether or not there are plural pieces of ID information whose associated reception time includes the present time therewithin (step S203). Specifically, the control unit 100 acquires the present time from the timer unit 110. Then, by referring to the contact destination information table 202, if the plural pieces of ID information whose call making setting is effective include any ID information for which a reception time is set, the control unit 100 determines whether or not the present time is within that reception time. The control unit 100 determines any ID information for which no reception time is set, as having a set reception time, which includes the present time therewithin, by determining that the associated phone number is open for phone call reception anytime. In this way, the control unit 100 determines whether or not the plural pieces of ID information whose call making setting is effective include a plurality of them whose reception time includes the present time therewithin.

In a case where there are plural pieces of ID information whose reception time includes the present time therewithin (step S203; YES), the control unit 100 determines to perform simultaneous calling (step S204). That is, in a case where the plural pieces of ID information associated with the name of the person to call include a plurality of them whose call making setting is effective and whose reception time includes the present time, the control unit 100 performs simultaneous calling at a later-described step using these pieces of ID information.

To the contrary, in a case where it is determined at step S201 that the person to call does not have plural pieces of ID information (step S201; NO), in a case where it is determined at step S202 that there are not plural pieces of ID information whose call making setting is effective (step S202; NO), or in a case where it is determined at step S203 that there are not plural pieces of ID information whose reception time includes the present time therewithin (step S203; NO), the control unit 100 determines not to perform simultaneous calling (step S205), and terminates this determination process. In this case, the control unit 100 will not perform simultaneous calling (step S102; NO).

As described above, when a call making request is received, the control unit 100 refers to the settings in the contact destination information table 202 in the information storage unit 103, and determines whether or not there are plural pieces of ID information which are set to be the object of simultaneous calling. Then, in a case where there are plural pieces, the control unit 100 performs simultaneous calling by using these plural pieces of ID information. For example, if a given person to contact has a plurality of hone numbers currently set to be the object of simultaneous calling, the control unit 100 performs control to make calls to these phone numbers in parallel, in different communication manners from each other.

The control unit 100 may specify any communication manner that senses a radio field intensity equal to or larger than a predetermined value, from among the communication manners used by the respective communication processing units 101A, 101B, . . . , and 101N, and acquire ID information which is associated with any communication manner specified as sensing a radio field intensity equal to or larger than the predetermined value from the contact destination information table 202, so that a phone call may be made to the phone number of that ID information. The control unit 100 may perform control such that simultaneous calling will be performed in a case where a plural pieces of ID information are acquired. In a case where there is only one piece of ID information acquired, the control unit 100 may perform control such that a phone call will be made only in the communication manner associated with the acquired one piece of ID information.

Returning to FIG. 4, in a case where it is determined at step S102 to perform simultaneous calling (step S102; YES), the control unit 100 acquires the plural pieces of ID information that are the object of simultaneous calling (step S103). Specifically, the control unit 100 reads out and acquires the plural pieces of ID information of the person to call, that are determined in the above-described determination process to be the object of simultaneous calling from the contact destination information table 202.

Next, the control unit 100 controls the communication processing units 101A, 101B, . . . , 101N to perform the simultaneous calling process using the acquired pieces of ID information (step S104).

For example, in a case where the user wants to contact "Hanako" stored in the contact destination information table 202 exemplified in FIG. 3B, the control unit 100 controls the CDMA communication processing unit 101A to call the first phone number 21 and controls the wireless LAN communication processing unit 101B to call the second phone number 222.

In this simultaneous calling process, in a case where the number M (M being an integer equal to or larger than 2) of pieces of ID information of the calling destinations is smaller than the number N (N being an integer equal to or larger than 2) of communication manners usable, which communication manners are to be selected can be determined by a plurality of methods. For example, the communication manners of the respective communication processing units 101A, 101B, . . . , and 101N may be selected in the order of these communication processing units. The radio field intensities sensed by the communication processing units 101A, 101B, . . . , and 101N may be compared and the communication manners of the units that sense higher radio field intensities may be selected. The communication manners that are often used by the user among usable communication manners may be selected preferentially. Or, the communication manners may be selected randomly. Other methods may be employed.

In this simultaneous calling process, in a case where the number M of pieces of ID information of the calling destinations is larger than the number N of usable communication manners, the control unit 100 performs the simultaneous calling process by extracting the same number of pieces of ID information as the number N of communication manners from the contact destination information table 202. The control unit 100 may randomly select N pieces of ID information from the M pieces of ID information, or may select N pieces in the order of higher frequencies of use by the user. Further, by referring to the contact destination information table 202, the control unit 100 acquires the communication manners associated with the pieces of ID information, and assigns these pieces of ID information indicating communication destinations to the communication processing units corresponding to the communication manners associated with these pieces ID information respectively to control the communication processing nits to make calls addressed to the pieces of ID information respectively.

Next, the control unit 100 displays information indicating that a phone call is now being made on the display unit 109 (step S105). Specifically, the control unit 100 inputs the status of "now making a phone call", the name of the person to call, the ID information (e.g., phone number) for which the phone call is now being made, etc. to the display processing unit 108, and the display processing unit 108 displays these kinds of information on the display unit 109.

Further, the control unit 100 controls the sound processing unit 105 to output a beep sound, and the sound processing unit 105 reproduces predetermined sound data stored in the information storage unit 103 to output a beep sound from the speaker 106 (step S106).

Next, the control unit 100 determines whether or not any one of the communication processing units 101A, 101B, . . . , and 101N has succeeded in connection (step S107).

In a case where any one of them has succeeded at step S107 (step S107; YES), the control unit 100 performs control such that voice data exchange may be performed between the communication processing unit 101X (X being an integer equal to or larger than 1 and equal to or smaller than N) that is the first to succeed in connection and the sound processing unit 105. That is, the control unit 100 starts voice communication (step S108).

In this way, the control unit 100 starts a phone talk with the phone number that is connected first. Here, to succeed in connection means that communication becomes possible between the calling person and the receiving person, with a calling notification issued to the person to call from the base station 50 or the access point 60 in response to the call made by the calling person, and with the person to call answering this calling notification.

Accordingly, the calling person, who uses the communication terminal 10, can establish communication quickly with the person to call, who has a plurality of phone numbers, by one calling operation.

Then, the control unit 100 selects encoding and decoding methods that match the communication manner that has gain the first connection, and starts a phone talk process. Thus, the user can talk by preferentially using the first-connected call.

Next, the control unit 100 stops the calls that have not yet succeeded in connection (step S109). Therefore, power consumption due to unnecessary call making can be reduced, and unnecessary calls to the receiving person can be eliminated. Further, the user can get in touch with the person to contact on the phone number quickly connected, and the person to contact can reduce the labor of answering the calls on the other phone numbers.

Next, the control unit 100 displays information indicating that a phone talk is being carried out on the display unit 109 (step S110). Specifically, the control unit 100 notifies the status of "now in talk", the name of the talking partner, the ID information (e.g., phone number) of the talking partner, etc. to the display processing unit 108 to have them displayed on the display unit 109.

In a case where none has succeeded in connection at step S107 (step S107; NO), the flow returns to step S105, and the control unit 100 keeps the display of "now making a phone call", etc. and waits until any succeeds in connection.

Here, in a case where a given communication manner is busy, in a case where a given communication manner of the communication terminal 10 or of the communication terminal at the connection destination can only sense a radio field intensity smaller than a predetermined value, or in a case where the calling location or the receiving location is outside the service area of a given communication manner, the control unit 100 may control the communication processing unit 101 corresponding to that communication manner to retry making a call, or give up communication.

When voice communication is started between the user and the communication partner, the control unit 100 determines whether or not the user has input an instruction for disconnecting the communication to the user interface unit 104 (step S111). For example, the user inputs an instruction for disconnecting the communication by pressing a talk give-up button or the like of the user interface unit 104.

In a case where there is no communication disconnection instruction (step S111; NO), the flow returns to step S110 so that control unit 100 keeps the display of "now in talk" and waits till there is a communication disconnection instruction.

When a communication disconnection instruction is given (step S111; YES), the control unit 100 disconnects communication by the communication processing unit now in connection (step S112), displays information indicating that communication is now being disconnected on the display unit 109 (step S113), and terminates this communication process. The control unit 100 also disconnects the communication in a case where the radio field intensity sensed by the communication manner used falls below a predetermined value during the communication or in a case where the communication is unexpectedly interrupted.

Meanwhile, in a case where it is determined at step S102 not to perform simultaneous calling (step S102; NO), the control unit 100 acquires the only one piece of ID information possessed by the person to call (step S114).

Then, the control unit 100 controls the communication processing unit 110Y (Y being an integer equal to or larger than 1 and equal to or smaller than N) that uses the communication manner associated with the acquired one piece of ID information, to perform a call making process (step S115). For example, the communication manner to be used when simultaneous calling is not required may be previously recorded in the information storage unit 103, so that the control unit 100 may select any of the communication processing units 101A, 101B, . . . , and 101N based on this information to have a call made by the selected unit Next, the control unit 100 displays information indicating that a phone call is now being made on the display unit 109 (step S116). Specifically, the control unit 100 notifies the status of "now making a phone call", the name of the person to call, the phone number of the calling destination, etc. to the display processing unit 108, to display them on the display unit 109.

Further, the control unit 100 requires the sound processing unit 105 to output a beep sound, and the sound processing unit 105 reproduces predetermined sound data stored in the information storage unit 103 to output a beep sound from the speaker 106 (step S117).

Next, the control unit 100 determines whether or not the communication processing unit 101Y now performing the call making process has succeeded in connection (step S118). Then, in a case where not yet succeeded in connection (step S118; NO), the flow returns to step S116, and the control unit 100 keeps the display of "now making a phone call", etc. and waits until the communication processing unit 101Y succeeds in connection.

In a case where the communication processing unit 101Y succeeds in connection at step S118 (step S118; YES), the control unit 100 establishes communication by the communication processing unit 101Y, and starts voice communication between the user and the communication partner (step S119). Then, the flow goes to step S110 so that the message of "now in talk" may be displayed.

By the communication process explained above, the communication terminal 10 according to the present embodiment can simultaneously make calls to a plurality of phone numbers which are associated with the name of the person to contact and which are set to be the object of simultaneous calling, by using a plurality of communication manners. Further, with the status of "now making a phone call" or the status of "now in talk" displayed on the display unit 109, the calling person can recognize the communication status. Therefore, by the calling person making only one request for calling the person to contact, who has a plurality of phone numbers, the communication terminal 10 can quickly establish communication with that person by performing simultaneous calling according to the user's settings.

Next, design examples of the screen displayed on the display unit 109 at step S105 of FIG. 4 will be explained.

Figure 6A:
FIGS. 6A, 6B, and 6C are diagrams showing examples of displays while a call is being made, according to the first embodiment of the present invention.
Figure 6B:
Figure 6C:
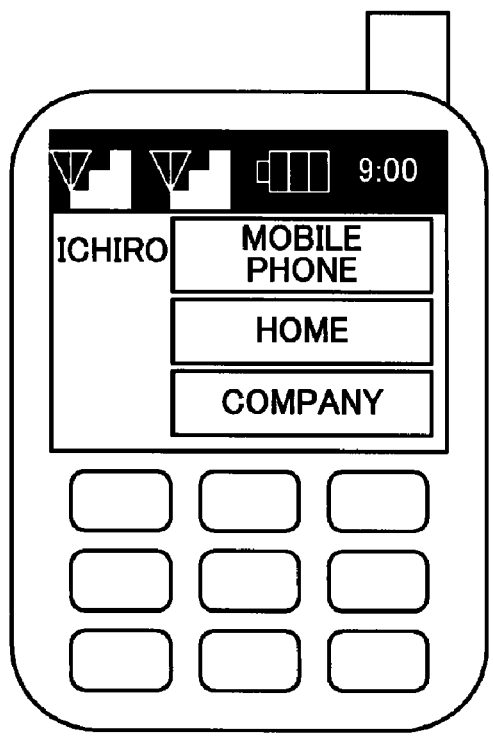

FIGS. 6A to 6C are diagrams showing examples of how the information indicating that a phone call is being made is displayed.

While the communication processing unit 101 is performing simultaneous calling, the control unit 100 controls the display processing unit 108 to display information indicating that a phone call is being made on the display unit 109.

For example, in a case where the user selects a name "Ichiro" from the contact destination information table 202 of FIG. 3B stored in the information storage unit 103 and instructs a phone call to be made to him, the control unit 100 controls the communication processing unit 101 to make calls to a plurality of phone numbers of his.

FIG. 6A is an example of a display which simply indicates that "Ichiro" is now being called, and does not indicate that calls are made to the plurality of phone numbers. In this case, the name of the person to contact and the information that a phone call is being made are displayed on the display unit 109. Such a display example is easy for the user to understand if the user does not mind which communication manner is being used, and effective in improving convenience.

FIG. 6B is an example of a display which indicates the classification types of the phone numbers to which phone calls are being simultaneously made. In this case, the name of the person to contact and information associated with the type names of the phone numbers to which phone calls are being made, indicating that a phone call is being made, are displayed on the display unit 109.

FIG. 6C is an example of a display which indicates the classification types of all the contact destinations of "Ichiro", and further indicates to which of these contact destinations phone calls are being simultaneously made. In this case, the name of the person to contact and the type names of all the contact destinations of the person to contact are displayed on the display unit 109, and furthermore the type names of the phone numbers to which phone calls are being made and the type names of the phone numbers to which phone calls are not being made are displayed distinguishably.

The display unit 109 may blinkingly display information that should be noted. For example, in FIG. 6C, the characters "mobile phone" and "home" may be displayed blinkingly to indicate that phone calls are being simultaneously made to the phone numbers of the classification types "mobile phone" and "home" among the contact destinations of "Ichiro" and further to imply that no phone call is being made to the phone number of the classification type "company".

By such displays as shown in FIG. 6B and FIG. 6C, the user can know to the phone numbers of which contact destinations phone calls are being made, enabled to become easily conscious of the calling destinations.

Next, design examples of the screen displayed on the display unit 109 at step S110 of FIG. 4 will be explained.

Figure 7A:
FIGS. 7A, 7B, and 7C are diagrams showing examples of displays while a phone talk is being carried out, according to the first embodiment of the present invention.
Figure 7B:
Figure 7C:

FIGS. 7A to 7C are diagrams showing examples of how information indicating that a phone talk is being carried out is displayed.

While a phone talk is being established by the communication processing unit 101, the control unit 100 controls the display processing unit 108 to display information indicating that a phone talk is being carried out on the display unit 109.

For example, in a case where phone calls are simultaneously made to the plurality of phone numbers of "Ichiro" and any one call succeeds in connection at step S107 of FIG. 4, a talk session is established at step S108 and the other calls are stopped.

FIG. 7A is an example of a display that simply indicates that a phone talk is being carried out with "Ichiro", and does not show the user the phone number of the connection destination or the classification type of the phone number, with no distinction about to which phone number the connection has been gained. In this case, the name of the person to contact and information indicating that a phone talk is being carried out are displayed on the display unit 109. Such a display is easy for the user to understand if the user does not mind which phone number is used for the phone talk, and effective in improving convenience.

FIG. 7B is an example of a display that distinguishes to which phone number connection has been gained and indicates the classification type of the phone number to which connection has been gained. In this case, the name of the person to contact and information associated with the type name of the phone number to which a phone talk is being carried out, indicating that a phone talk is being carried out, are displayed on the display unit 109. Such a display enables the user to easily recognize to which phone number he/she is talking.

The display examples shown in FIG. 6 may be arbitrarily combined with the display examples of FIG. 7. For example, only the name of the person to contact and the message of "now making a phone call" may be displayed with no distinction of the phone numbers of the calling destinations as exemplified in FIG. 6A while phone calls are being made, and the classification type of any phone number may be displayed as exemplified in FIG. 7B after communication is established. Such a display is appropriate in a case where the user does not mind to which destinations phone calls are made while phone calls are being made but wants to know the classification type of the phone number when connection is actually gained.

FIG. 7C is an example of a display which appears after phone calls are made to a plurality of phone numbers simultaneously, and which indicates the call, which has succeeded in connection first, as "now in talk", and further indicates that the call that has not yet succeeded in connection is being disconnected. In this case, the name of the person to contact, information associated with the type name of the phone number with which a phone talk is being carried out, indicating that a phone talk is being carried out, and information associated with the type name of the phone number being disconnected, indicating that the connection attempt is being disconnected, are displayed on the display unit 109. Such a display enables the user to easily recognize the status of to which phone number connection has been gained and the status of to which phone number calling is stopped.

Next, the owner information table 201 and the contact destination information table 202 will be explained in detail.

The owner information table 201 shown in FIG. 3A stores the name of the owner of the communication terminal 10, ID information (phone number), the type of the ID information, the communication manner, etc. in association. By the control unit 100 referring to this owner information table 201 and controlling the communication processing unit 101 to perform simultaneous calling by using a plurality of calling-side phone numbers stored in the owner information table 201, the calling person can make phone calls to a plurality of phone numbers simultaneously with a simple operation.

The user can input, update or delete association between ID information and a communication manner in the owner information table 201. Thus, the user can adjust which ID information and communication manner are to be used, according to the user's circumstance. The ID information may not only be a phone number, but an IP address, a MAC address, a host name, etc.

The priority of the ID information to be used in the above-described simultaneous calling process may be set by the user from the user interface unit 104. The information in the owner information table 201 stored in the information storage unit 103 may be rewritten to match the radio field intensity sensed by the communication terminal 10. For example, ID information associated with a communication manner which senses a high radio field intensity may be stored with its priority set high in the information storage unit 103. Thereby, the calling person can more quickly start a phone talk with a desired communication partner.

The owner information table 201 may further store a time slot during which it is allowed to make a call, for each ID information, and the control unit 100 may select ID information whose time slot includes the present time therewithin from the pieces of ID information stored in the owner information table 201, so that a phone call may be made from that ID information. Thereby, the calling person can use different phone numbers according to the time slots.

The user can also rewrite, update, or delete the contact destination information table 202 shown in FIG. 3B, from the user interface unit 104. With the use of this contact destination information table 202, the calling person needs to give only one call making instruction in order that phone calls are made simultaneously to the phone numbers associated with the name of a person to contact, and the time period that passes before a hone talk is started can therefore be shortened.

For example, in a case where the user wants to get in touch with any family member as soon as possible, the user selects the title "family". In the contact destination information table 202 of FIG. 3B, the CDMA communication manner is set for the first hone number 231 associated with "family", and the wireless LAN communication manner is set for the second phone number 232. When the calling person selects "family" to make a phone call, the communication processing unit 101 makes a call to the first phone number by the CDMA communication manner and makes a call to the second hone number by the wireless LAN communication manner simultaneously. Since the call making setting of the third phone number 233 is "0", a phone call is not simultaneously made to the third phone number 233 even when "family" is selected.

In this way, by instructing only once that phone calls should be made to "family", the calling person can have phone calls simultaneously made to a plurality of phone numbers associated with "family". Further, according to the information of call making settings, not that all pieces of ID information associated with the name selected by the user are used to make phone calls, but phone calls can be made to be addressed to the ID information selected by the user beforehand.

Further, in performing simultaneous calling, if the same communication manner is associated with different pieces of ID information, the control unit 100 selects only one of these pieces of ID information to make a phone call. The selection method is arbitrary, and, for example, one that is used the most frequently is selected.

The communication terminal 10 at the calling side has ID information (e.g., phone umber) for each communication manner. Hence, the control unit 100 may manage which ID information is to be notified to the person to call, by using the contact destination information table 202. This is because if a phone call is made to the communication terminal of the person to call with the use of ID information of the calling person that has not been notified to the person to call, the receiving person might not answer the phone call, not being able to know who is calling. Thus, the ID information of a communication partner, and the ID information already notified to that person are stored in association in the contact destination information table 202 beforehand. Then, in performing simultaneous calling, the control unit 100 makes phone calls by using the ID information of the calling person associated with the ID information of the person to call. Thereby, the calling person can make a phone call by using the phone umber notified to the person to call, and can therefore use different phone numbers according to the persons to call.

Further, in a case where the calling person is particularly in an urgent need to get in touch with someone, the communication terminal 10 may try making all possible phone calls, ignoring the setting information such as communication manners, call making settings, reception times, etc. in the contact destination information table 202. For example, when the name of a person to call and information indicating that urgency should particularly be taken are input to the user interface unit 104, the communication terminal 10 reads out all pieces of ID information that are associated with the input name from the contact destination information table 202, and performs simultaneous calling by using all the pieces of ID information corresponding to the communication manners usable. This scheme is suitable for a case where the urgency of the calling side (communication terminal 10) comes before the circumstance of the receiving side.

Further, the name of a communication partner and an e-mail address of that person may be stored in association in the contact destination information table 202. In this case, for example, when voice communication is not available, the control unit 100 sends an e-mailed addressed to the e-mail address associated with the name of the person to call in the contact destination information table 202. Further, an e-mail may be sent at an arbitrary timing together with a phone call being made. This makes it possible to directly send a message to the home PC of the person to call, or to send data simultaneously with sending a voice, increasing the possibility of succeeding in quick contact. Other than an e-mail, a known network messaging system using an IP address, a MAC address, a host name, etc. may be utilized.

Further, this makes it possible to notify the reason for calling, by using, as the notification addressee, an e-mail address or the like associated with the name of the person to contact, in a case where the person to contact has not answered the call. This improves convenience.

Second Embodiment

The second embodiment of the present invention will next be explained.

According to the present embodiment, even when one of the calls simultaneously made to a plurality of phone numbers succeeds in connection, the control unit 10 does not stop the other calls that have not yet succeeded in connection.

FIG. 8 is a flowchart showing a communication process by the communication terminal 10 according to the second embodiment of the present invention. To simplify the explanation, it is assumed that the communication terminal 10 has determined to perform simultaneous calling.

When simultaneous calling is requested by the user, this communication process is started. The control unit 100 acquires plural pieces of ID information that are the object of simultaneous calling (step S301). For example, when the name of a person to contact is input to the user interface unit 104, the control unit 100 refers to the contact destination information table 202, and extracts pieces of ID information that satisfy the above-described conditions of call making setting and reception time from the pieces of ID information associated with the name of the person to contact. Without referring to the contact destination information table 202, the control unit 100 may use plural pieces of ID information input to the user interface unit 104 as pieces of ID information to be the object of simultaneous calling.

Next, the control unit 100 controls the communication processing units 101A, 101B, . . . , and 101N likewise at steps S104 to S106 of FIG. 4, to perform simultaneous calling by using the plural pieces of ID information acquired (step S302), displays information indicating that a phone call is being made on the display unit 109 (step S303), and controls the sound processing unit 105 to reproduce a beep sound (step S304).

The control unit 100 controls the communication processing units 101A, 101B, and 101N to perform the process from communication connection to communication disconnection in parallel. Here, the communication process performed by the communication processing unit 101A and the control unit 100 will be explained. The same process will be performed by the communication processing units 101B to 101N.

The control unit 100 determines whether or not the communication processing unit 101A has succeeded in connection (step S305). In a case where not yet succeeded in connection (step S305; NO), the flow returns to step S303 so that the information indicating that a phone call is being made is continuously displayed on the display unit 109.

In a case where the communication processing unit 101A has succeeded in connection (step S305; YES), the control unit 100 establishes communication by the communication processing unit 101A to start voice communication likewise at step S108 of FIG. 4 (step S306).

Next, the control unit 100 displays information indicating that a phone talk is being carried out to the display unit 109, likewise at step S110 of FIG. 4 (step S307).

Then, the control unit 100 determines whether or not an instruction for disconnecting communication by the communication processing unit 100A has been issued (step S308), and if no communication disconnection instruction has been issued (step S308; NO), returns to step S307 to continuously display the information that a hone talk is being carried out.

In a case where an instruction for disconnecting communication by the communication processing unit 101A is issued (step S308; YES), the control unit 100 disconnects communication by the communication processing unit 101A (step S309), displays information indicating that communication is being disconnected on the display unit 109 (step S310), and terminates the communication process.

The process from steps S305 to S310 is performed for each of the communication processing units 101A to 101N in parallel.

In a case where a plurality of communications are established, the control unit 100 controls the sound processing unit 105 to synthesize a plurality of voices by mixing, etc., to enable talks with a plurality of persons at the same time. Thereby, in a case where the calling person transmits the same information to all members grouped under, for example, "family" or has an urgent message to be transmitted, he/she can communicate with a plurality of persons simultaneously.

As obvious from the above, the communication terminal 10 according to the present embodiment can establish a plurality of communications simultaneously and the user can talk with a plurality of talking partners simultaneously.

Further, in a case where phone calls are made to a plurality of phone numbers simultaneously and connection can be gained with a plurality of connection destinations, the user is asked, about each connection destination, whether or not to disconnect communication. Then, the user selects which to disconnect, from the user interface unit 104.

Figure 9:
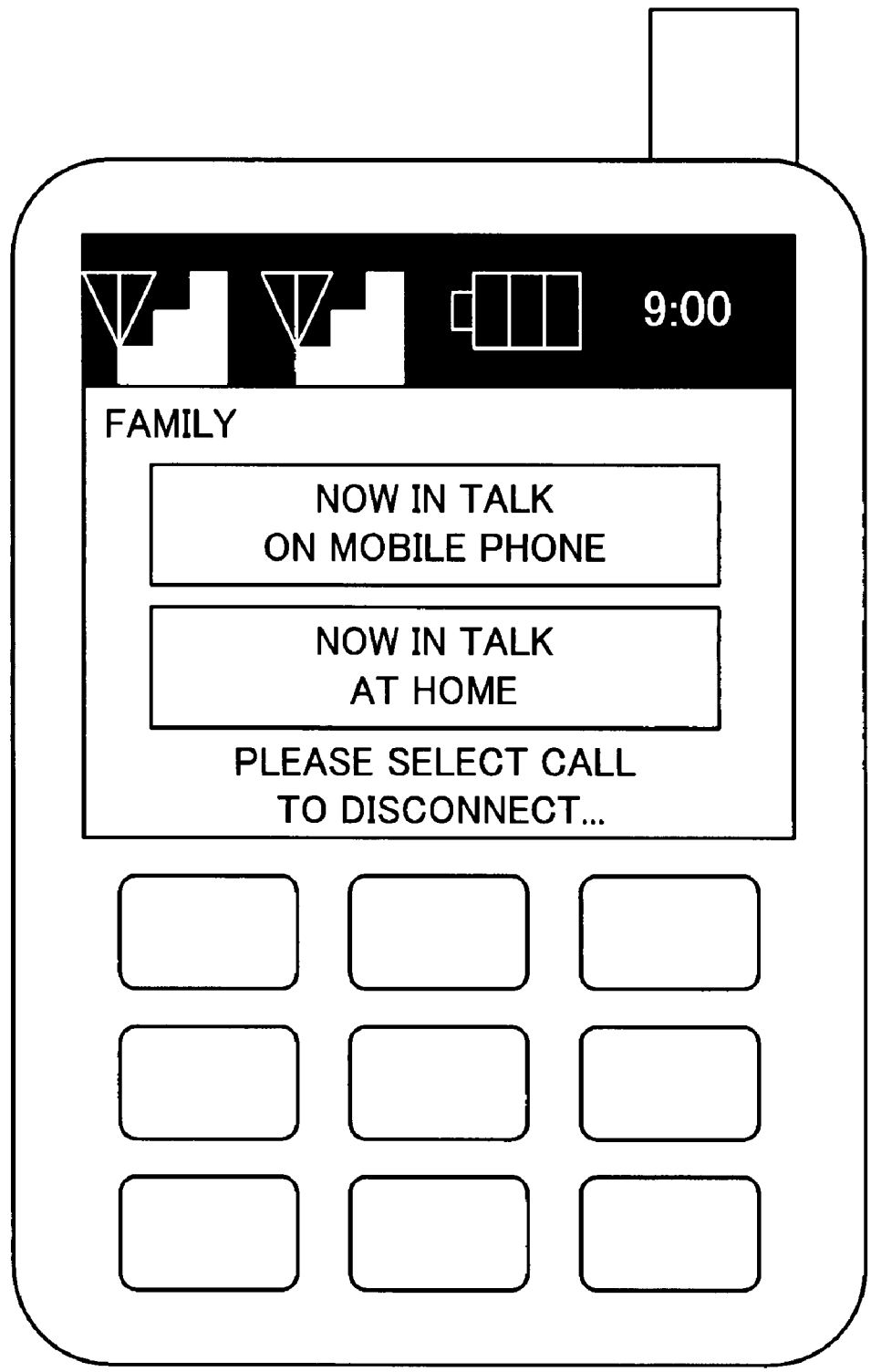
FIG. 9 is a diagram showing an example of a display while a phone call is being carried out.

FIG. 9 is a diagram showing an example of a display of information indicating that a phone talk is being carried out. As illustrated, in a case where phone calls are made to the respective members of "family" simultaneously and connection to the phone numbers of "mobile phone" and "home" can be gained, the display unit 109 displays information indicating that a phone talk is being carried out, for each classification type. When the user selects a phone talk to disconnect from the displayed list, the control unit 100 controls the communication processing unit 101 to disconnect the selected phone talk.

Such control enables the phone talker to disconnect the talk anytime he/she likes, in a case where, for example, he/she no longer needs to talk with a plurality of persons simultaneously. Further, it is also possible to reduce the power to be consumed, by reducing the number of simultaneous connections.

The user can select which of the lines, on which communication has been able to be established, to use preferentially, by operating the user interface unit 104. Further, the user can select whether to hold or disconnect the phone talk that is not selected.

Figure 10A:
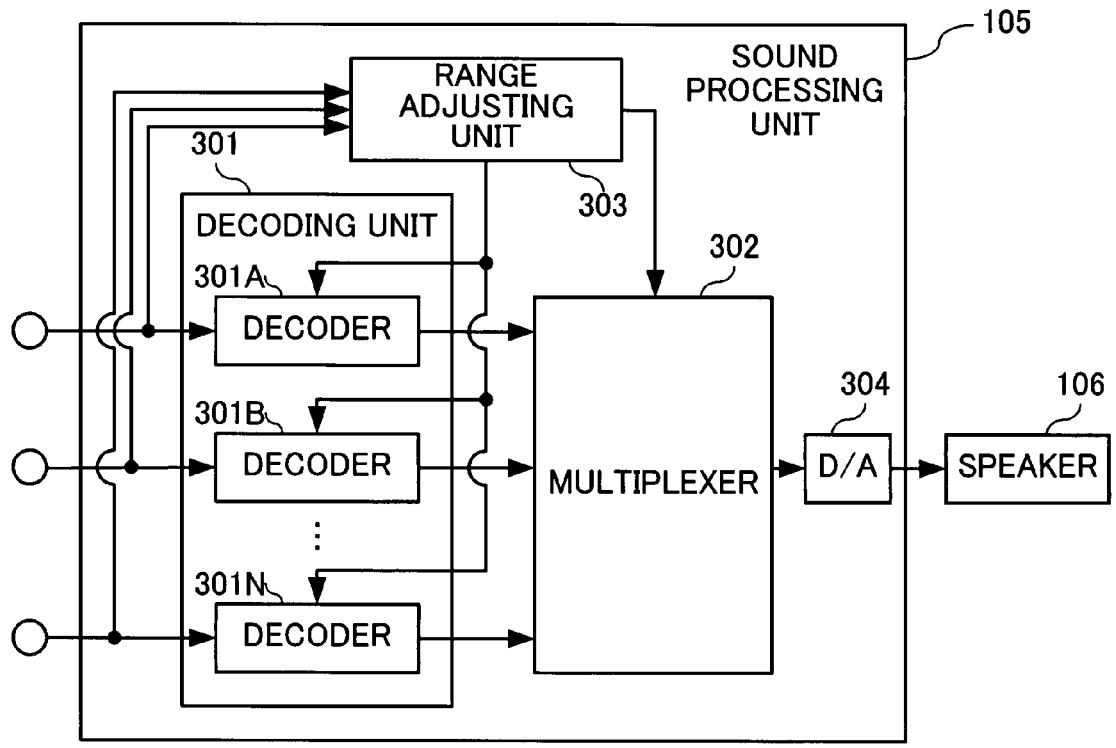
FIGS. 10A and 10B are diagrams showing the structure of a sound processing unit according to a second embodiment of the present invention.
Figure 10B:
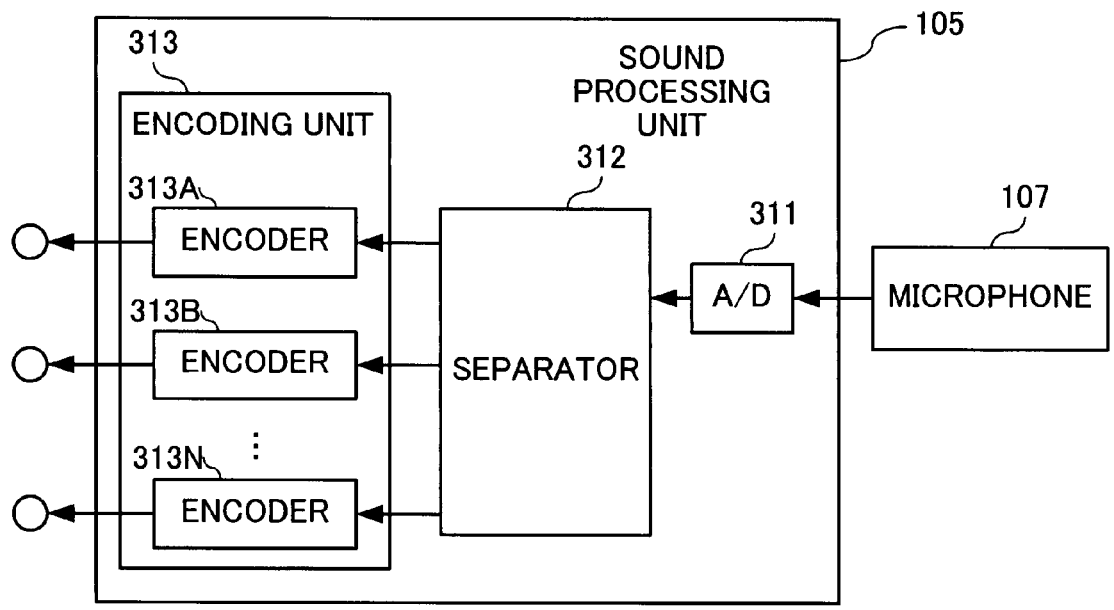

FIGS. 10A and 10B are diagrams showing examples of the structure of the sound processing unit 105 in the communication terminal 10 according to the present embodiment.

FIG. 10A is an example of the structure by which sound signals are input from the communication processing units 101A to 101N to the sound processing unit 105. FIG. 10B is an example of the structure by which sound signals are output from the sound processing unit 105 to the communication processing units 101A to 101N.

As shown in FIG. 10A, a decoding unit 301 comprises decoders 301A, 301B, . . . , and 301N for respective communication manners, which decode encoded signals input from the communication processing units 101A, 101B, . . . , and 101N. The decoders 301A to 301N are designed for the encoding methods used by the CDMA communication processing unit 101A, the wireless LAN communication processing unit 101B, . . . respectively, and decode digitally-encoded sound information sent from the communication processing units 101A to 101N respectively.

A multiplexer 302 mixes the sound signals output from the decoders 301A to 301N of the decoding unit 301.

A range adjusting unit 303 adjusts the dynamic ranges of the sound information input from the communication processing units 101A to 101N, to impart an equalized sound level to the information signals when the signals are to be multiplexed by the multiplexer 302.

A D/A converting unit 304 converts a digital signal multiplexed by the multiplexer 302 into an analog signal, and outputs it to the speaker 106.

As a result, mixed voices are output from the speaker 106, and the user can hear the sound information transmitted from the communication processing units 101A to 101N from one speaker at the same time.

With reference to FIG. 10B, an A/D converting unit 311 converts an analog sound input from the microphone 107 into a digital signal.

A separator 312 separates the digital signal input from the A/D converting unit 311 to be distributed for respective encoding methods, and sends them to an encoding unit 313.

The encoding unit 313 comprises a plurality of encoders 313A to 313N, which encode digital signals sent from the separator 312. The respective encoders 313A to 313N encode the digital signals based on their own encoding methods (or communication manners), and output them to the communication processing units 101A to 101N.

Thereby, the sound input from the microphone 107 is encoded according to the rule that matches the sound codec used in each communication manner, and the voice of the calling person can be transmitted to a plurality of communication partners simultaneously.

The sound processing unit 105 may have a structure including a plurality of decoders and encoders as shown in FIGS. 10A and 10B, or may have a structure in which one decoder or one encoder is time-switched. With the structure including a plurality of decoders or encoders, the sound processing unit 105 can process a plurality of sound codecs in parallel and perform a communication process rapidly. With the structure having one time-switching decoder/encoder, the sound processing unit 105 can reduce its circuit size.

These may be structured by hardware or by software. If by hardware, rapid parallel processes that match the hardware performance can be performed. If by software, easier functionality expansion is available in adapting to a new codec.

Third Embodiment

Next, a modified example of the sound processing unit 105 will be explained.

Sound information, which is time-divided or separated with serial information called CALL_ID assigned thereto, is sent from the communication processing units 101A to 101 to the sound processing unit 105.

CALL_ID is a number pre-assigned to each of the communication processing units 101A to 101N. In sound information separation, for example, sound information transmitted in a CDMA manner is assigned CALL_ID "1", and sound information transmitted in a wireless LAN manner is assigned CALL_ID "2".

Figure 11A:
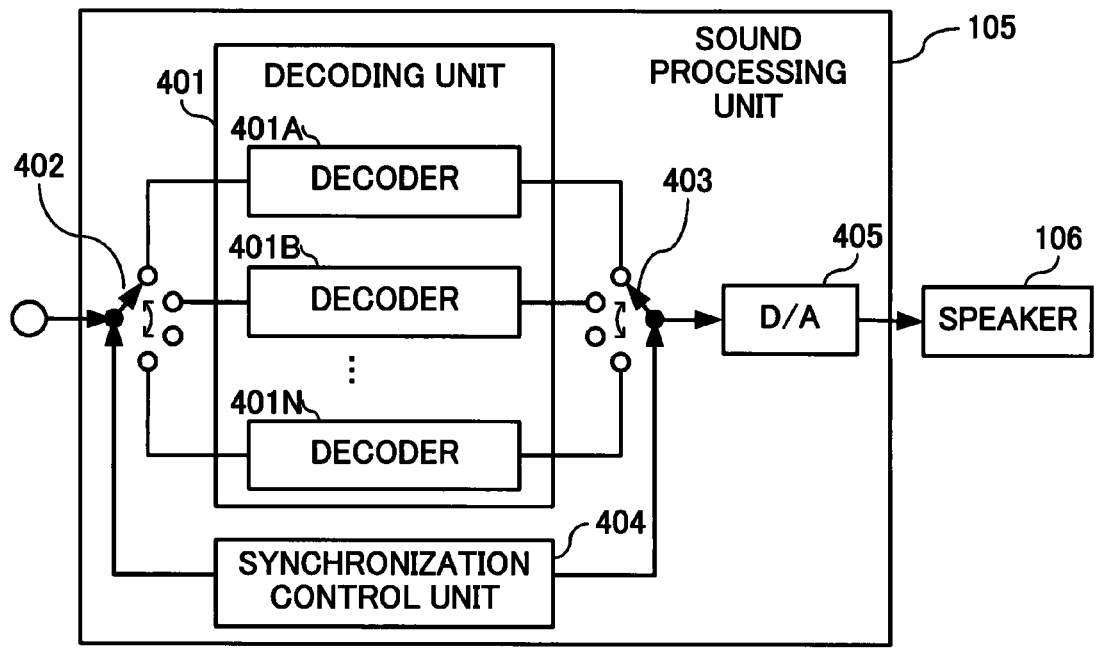
FIGS. 11A and 11B are diagrams showing the structure of a sound processing unit according to a third embodiment of the preset invention.
Figure 11B:
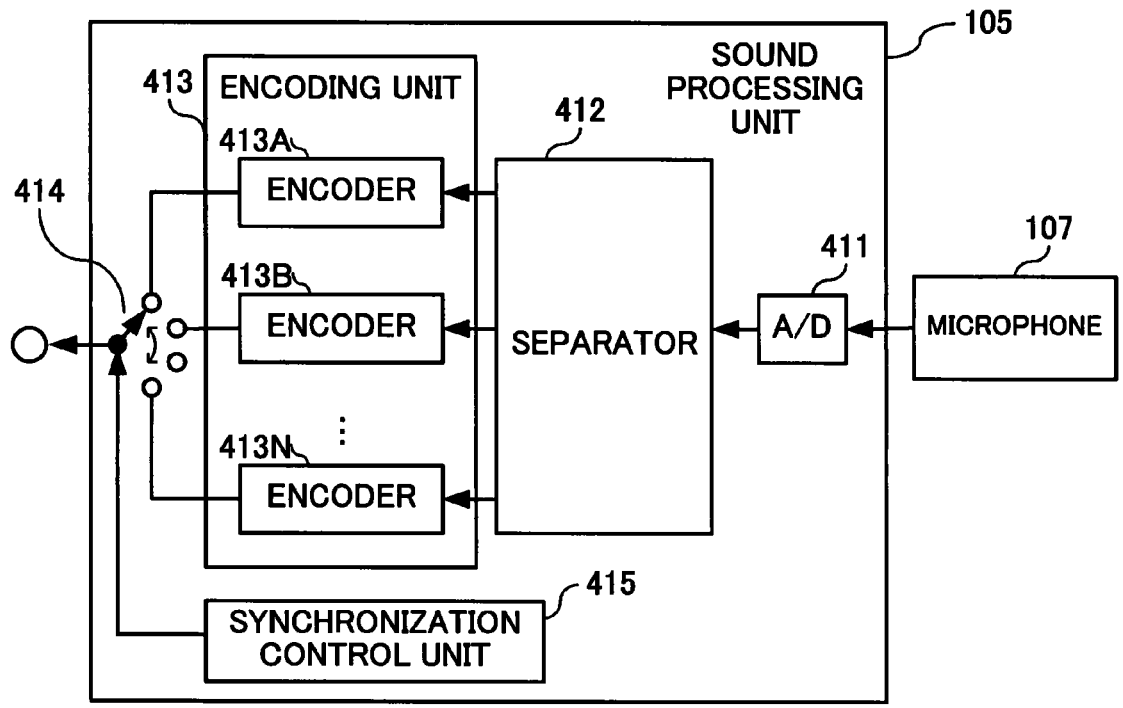

FIG. 11A is a diagram showing a structure by which sound signals are input from the communication processing units 101A to 101N to the sound processing unit 105. FIG. 11B is a diagram showing a structure by which sound signals are output from the sound processing unit 105 to the communication processing units 101A to 101N.

A decoding unit 401 performs similar processes to those of the decoding unit 301 of FIG. 10A, and comprises one decoder for each encoding method (communication manner). The respective decoders 401A, 401B, . . . , and 401N correspond to the encoding methods used by the communication processing units 101A, 101B, . . . , and 101N respectively.

A switch 402 directs encoded sound information, which is time-divided and sent from the communication processing unit 101, based on time or CALL_ID, so that the sound information is input to any of the decoders 401A to 401N.

A switch 403 outputs a digital signal decoded by any of the decoders 401A to 401N of the decoding unit 401 to a D/A converting unit 405.

A synchronization control unit 404 synchronizes the switching timings of the switch 402 and the switch 403, by a synchronization clock. By controlling the switch 402 and the switch 403 to be switched synchronously, the synchronization control unit 404 can determine a path that is suitable for the encoding method by which the sound information sent from the communication processing unit 101 has been encoded.

The D/A converting unit 405 converts a composite digital signal output from the decoding unit 401 through the switch 403 into an analog audio signal and outputs it to the speaker 106. Consequently, mixed voices are output from the speaker 106 and the user can hear the voices of all the persons with whom the user is communicating at the same time.

Further, the sound processing unit 105 shown in FIG. 11A acquires sound information to which CALL_ID is assigned from the communication processing unit 101, and selects any of the decoders 401A to 401N that matches each CALL_ID by means of the switch 402, so that the sound information is decoded by the selected decoder. Hence, the user can hear sound information transmitted from the communication processing units 101A to 101 from the speaker 106 simultaneously.

An A/D converting unit 411 converts an analog sound input from the microphone 107 into a digital signal.

A separator 412 separates the digital signal input from the A/D converting unit 411 for the respective encoding methods, and sends the separated signals to an encoding unit 413.

The encoding unit 413 performs similar processes to those of the encoding unit 313 of FIG. 10B, and comprises a plurality of encoders 413A to 413N. The respective encoders 413A to 413N encode signals based on their own encoding methods (communication manners).

A switch 414 switches the output destinations of the encoders 413A to 413N from one to another among them, when encoded sound information is sent to the communication processing unit 101.

A synchronization control unit 415 switches the switch 414 by a synchronization clock.

The switch 414 is switched by a synchronization clock at a timing synchronous with the communication processing unit 101. At such switching timings, sound information encoded by the respective encoders 413A to 413N is sent to the communication processing unit 101. Then, by the communication processing unit 101 processing the sound information by time-division, the voice of the calling person can be transmitted to the respective communication destinations.

The encoders 413A to 413N may affix CALL_ID. In this case, the communication processing unit 101 selects any of the communication processing units 101A to 101N for each CALL_ID.

As described above, the sound input from the microphone 107 is encoded according to the rules that match the sound Codecs used by the respective information processing units 101A to 101N, and the communication terminal 10 can transmit the voice of the calling person to a plurality of persons simultaneously.

The communication terminal 10 may comprise a plurality of decoders or encoders, or may use one decoder or one encoder in a time-switching manner. With a structure that comprises a plurality of decoders or encoders, the communication terminal 10 can process a plurality of sound Codecs in parallel and realize a rapid communication process. With the structure that uses one decoder/encoder in the time-switching manner, the communication terminal 10 can reduce its circuit size.

These may be structured by hardware or by software.

With the communication terminal 10 according to the present embodiment, since the user can carry out plural talks simultaneously, for example, the user may set a call to be made to a phone number of a preset specific destination such as police or fire department, t the same time of making a call to a selected person. In this case, for example, specific D information (phone number) of police, fire department, etc. is stored in the information storage unit 103 beforehand. Then, when the name of a person to call and information indicating urgency are input to the user interface unit 104, calls are made to the selected erson and to the preset specific ID information simultaneously. Therefore, urgent information can be transmitted to different destinations with a simple operation. Arbitrary ID information can be set as this specific ID information.

Other Embodiments

Next, other embodiments of the present invention will be explained.

When a call is stopped at step S109 of FIG. 4 before a phone talk is started, the receiving person feels doubtful why the communication is disconnected. According to the present embodiment, the communication terminal 10 can send a message showing the reason for disconnection to the receiving person.

For example, data area for showing the reason for disconnection is prepared beforehand in the data to be sent or received by the communication processing unit 101. Information (message information) indicating the reason for disconnection such as "connection to another communication destination has been gained", "no call back required", etc. is stored in this data area and sent to the receiving person. Therefore, after the communication is disconnected, the terminal of the receiving person can display the message indicated by the received message information, and the receiving person can know the reason for disconnection.

Further, after disconnection, the reason for disconnection may be e-mailed to the receiving person. In this case, for example, an e-mail address is stored beforehand in the contact destination information table 202 of the information storage unit 103 together with the phone number, and the control unit 100 sends an e-mail to which the reason for disconnection is attached, to the e-mail address of the person having the communication disconnected.

In a case where a plurality of phone calls have been made simultaneously but none has succeed in connecting with the destination, a notification of this complete connection failure may be sent to the connection destinations. For example, message information indicating a reason for disconnection such as "nobody can be reached" or the like is sent to the contact destinations. Further, the message information may be sent, when communication is disconnected from each of the communication destinations at step S309 of FIG. 8.

According to the above-described embodiments, the calling person's phone numbers are assigned to the communication processing units 101A, 101B, . . . , and 101N on the basis of one phone number per communication manner, as indicated in the owner information table 201 in the information storage unit 103. By the same token, another phone number of the calling person's, that is for simultaneous calling, may be stored in the information storage unit 103 beforehand, and the control unit 100 may select the communication manner associated with the phone number for simultaneous calling, when performing simultaneous calling. Further, when performing simultaneous calling, the calling person may manually select the phone number for simultaneous calling.

The control unit 100 may preferentially select a communication manner by which the receiving person can receive a high-intensity radio wave, so that a phone call may be made from a phone number that is associated with the selected communication manner in the owner information table 201.

Here, a communication manner by which the receiving person can receive a high-intensity radio wave is a communication manner in which indicators of radio field intensity, such as RSSI (Received Signal Strength Indicator), C/I (Carrier-to-Interference Ratio), Ec/Io indicating pilot strength, etc. have large values. For example, the correspondence between the values of a radio field intensity indicator and connection rates is experimentally obtained beforehand for each of the different communication manners such as a CDMA communication manner, a wireless LAN communication manner, etc., and a table that associates the values of the radio field intensity indicator with the connection rates for each communication manner is stored in the information storage unit 103. Then, the control unit 100 measures the radio field intensity of each communication manner when performing simultaneous calling, refers to this table, and preferentially selects any communication manner that is associated with the highest connection rate. Since this allows the communication terminal 10 to preferentially select a communication manner that can easily gain connection, the communication terminal 10 can make it easier to be connected to the person to contact in a short time.

Further, for example, in a case where the base station imposes a restriction on call making for a reason such as a traffic jam in a given communication manner, or in a case where the radio field intensity is not stable in a given communication manner, the control unit 100 may select any other communication manner than that communication manner to have a call made.

In a case where a plurality of communication manners that can be used by the communication terminal at the receiving side are known beforehand, the control unit 100 may perform simultaneous calling by using the plurality of communication manners that ca be used by the communication terminal at the receiving side. For example, the information storage unit 103 may further store flags for each classification type stored in the contact destination information table 202, to indicate that a plurality of flag-attached communication manners can be used by the classification type concerned. The control unit 100 may refer to the flags and determine the communication manners that can be used at the receiving side.

The communication terminal 10 according to the embodiments may be used for sending arbitrary data to receiving persons, not only for making phone calls. In this case, the addresses of the data addressees are input by the user and the control unit 100 sends the data to the input addresses simultaneously. Thereby, the communication terminal 10 can send a message to a plurality of addressees by one sending operation in data communications for character information, videos, images, etc., not only in voice communications.

In a case where call making in a given communication manner fails in the course of the process for such a reason as weak radio field intensity, etc., the control unit 100 may select whether to give up the call making in that communication manner or to retry and redial. In this case, for example, information indicating which course of action to select is stored in the information storage unit 103 beforehand. Alternatively, the user may select the course to take from the user interface unit 104 each time. In a case where the communication terminal 10 fails in authentication by the wireless LAN access point 60 or the CDMA base station 50, or in a case where the communication terminal 10 is outside the service area of the communication, it is preferred to select the course of giving up, not the retry. In a case where the call making failure is due to weak radio field intensity, it is preferred to select the course of retrying the call making.

The beep sound during call making, which is output from the speaker 106, may be output for only selected one of a plurality of calls being made, or sounds may be mixed to output beep sounds for all the calls. For example, the sound processing unit 105 shown in FIG. 10A may mix sound data. Alternatively, the sound processing unit 105 shown in FIG. 11A may alternately switch the sounds to be output.

In a case where any one of the beep sounds is selected to be output, the user can recognize a situation that a phone call is being made and has not yet gain connection, by sound. In a case where all the beep sounds are mixed and output from the speaker, the user can easily recognize a situation that phone calls are being made simultaneously.

In a case where all the beep sounds are output to be heard, the tones and volumes of the beep sounds may be varied for the plurality of calling destinations. The tones and volumes of the beep sounds may be varied by the communication processing unit 101 or by the sound processing unit 105. In a case where done by the communication processing unit 101, for example, frequencies used for the beep sounds are assigned to the communication processing units 101A to 101N beforehand. In a case where done by the sound processing unit 105, for example, CALL_IDs may be discriminated and the range adjusting unit 303 adjusts the volume.

When any of the calls simultaneously made succeeds in establishing communication, the beep sounds for the other calls simultaneously made may be stopped, or some or all of them may be continuously output. For example, the user selects which of these actions to be taken beforehand to store setting information for the selection in the information storage unit 103, and the control unit 100 selects any action based on the setting information.

Alternatively, the user may select the beep sounds to be stopped from the beep sounds of all the calls from the user interface unit 104, and the control unit 100 may switch the beep sounds in real time. In this case, the communication processing unit 101Z (Z being an integer equal to or larger than 1 and equal to or smaller than N) does not send the sound information of the beep sound to the sound processing unit 105.

To stop all the other beep sounds when any call succeeds in establishing communication is suitable for a case where the user can be satisfied if any one of the calls succeeds in connection, and does not care if the other calls cannot gain connection. To keep outputting some or all of the other beep sounds when any call succeeds in establishing communication is suitable for a case where the user wants to be connected to as many persons as possible simultaneously.

The communication terminal 10 according to each of the above-described embodiments of the present invention can achieve the following effects.

The communication terminal 10, which can perform communications in a plurality of communication manners, can increase the rate of success in connecting to the person whom the user wants to get in touch with and shorten the time to be taken before connection success, by making calls to different phone numbers in different communication manners in response to one call making operation of the user.

By selecting the communication manner that first succeeds in connection, the communication terminal 10 can make the user to talk over the phone line that is first connected.

In a case where connection is gained to different persons in different communication manners in parallel, the communication terminal 10 can enable the user to hear the voices of a plurality of persons simultaneously, by mixing voices of some or all of the phone talks and output them from the speaker.

By displaying information indicating the calling destinations and calling statuses when performing simultaneous calling, the communication terminal 10 can allow the user to know to whom he/she has currently succeeded in connection and has not yet succeeded in connection.

Further, the communication terminal 10 can select not to display information of the calling destinations when performing simultaneous calling, and does not bother the user to mind which phone numbers are being used.

The communication terminal 10 can allow the user to select the phone call to disconnect, and can reduce the power to be consumed by disconnecting the call unnecessary for the user.

By pre-storing a setting for simultaneous calling in association with contact destination information such as the names of the persons to call, phone numbers, e-mail addresses, etc., and performing simultaneous calling based on this setting, the communication terminal 10 can allow the user to make calls to a plurality of phone numbers simultaneously with a simple operation.

By pre-storing times in which the respective communication manners can be used so that a communication manner can be selected based on this, the communication terminal 10 can use different communication manners (phone numbers to be used for communication) according to the user's circumstance.

By stopping calls other than the call that is connected first, the communication terminal 10 can reduce the power to be consumed, and reduce unnecessary calls to the receiving person.

By notifying the reason for disconnection of the stopped calls, the communication terminal 10 can free the receiving person from any anxiety or load.

The embodiments of the present invention, which have been described above, are examples for explaining the present invention, not meant to limit the scope of the present invention to them. Those having ordinary skill in the art can implement the present invention in various other embodiments without departing from the schemes, designs, etc. of the present invention.

For example, the memory space prepared for the information storage unit 103 may be a memory (e.g., a known flash memory, etc.) detachable from the communication terminal 10. Therefore, even in a case where the user buys a new communication terminal 10, he/she can continuously use the data accumulated till that time, by attaching this memory to the new terminal.

Further, for example, a recording medium which stores a program for controlling a computer to perform the above-described operations may be provided.

Specifically, the above-described embodiments have assumed that a program for controlling the communication terminal 10 to perform each of the above-described processes is pre-stored in the memory. However, a program for performing the above-described processes may be stored and distributed in a computer-readable recording medium such as a flexible disk, a CD-ROM (Compact Disc Read-Only Memory), a DVD (Digital Versatile Disk), an MO (Magneto-Optical disk), etc., so that the program may be installed on an existing communication terminal to structure the communication terminal to perform the above-described processes.

Further, the program may be stored in a disk device or the like comprised in a predetermined server apparatus on a communication network such as the Internet, etc., so that the program may be embedded on a carrier wave and downloaded to a communication terminal. Further, the above-described processes can be realized by the program being activated and executed while being transmitted through a communication network.

In a case where an OS (Operating System) takes part in realizing the above-described functions, or the OS and an application work in cooperation to realize the functions, portions that are not realized by the OS may only be stored and distributed in a medium, or downloaded to a communication terminal.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2006-134441 filed on May 12, 2006 and including specification, claims, drawings and summary. The disclosure of the above Japanese Patent Application is incorporated herein by reference in its entirety.

What is claimed is:

1. A communication terminal apparatus, comprising:
a first communication unit which performs communication in a predetermined first communication manner;
a second communication unit which performs communication in a predetermined second communication manner different from the first communication manner;
a storage unit which stores plural pieces of identification information for specifying a communication destination, in association with a person to communicate with, and stores information indicating a communication manner in association with each of the plural pieces of identification information;
an input reception unit which receives from a user an instruction input for designating the person to communicate with; and
a communication control unit which reads out, from the plural pieces of identification information stored in association with the person to communicate with, who is indicated by the instruction input received by the input reception unit, identification information of a first communication destination of the person to communicate with and identification information of a second communication destination that is different from the first communication destination, when communication with the person to communicate with is to be carried out; and controls the first communication unit to send a communication request call by using the read-out identification information of the first communication destination and controls the second communication unit to send a communication request call by using the read-out identification information of the second communication destination in parallel with sending of the communication request call by the first communication unit,
wherein at least one of the first communication unit and the second communication unit performs communication in a wireless communication manner, wherein the communication terminal apparatus further comprises a radio field intensity acquiring unit which acquires a radio field intensity of the wireless communication manner used by at least one of the first communication unit and the second communication unit, and wherein if pieces of identification information associated with the person to communicate with indicated by the instruction input received by the input reception unit include identification information associated with the wireless communication manner, the communication control unit reads out identification information associated with the wireless communication manner which has a radio field intensity acquired by the radio field intensity acquiring unit that is equal to or larger than a predetermined value.

2. A communication terminal apparatus comprising:

a first communication unit which performs communication in a predetermined first communication manner;

a second communication unit which performs communication in a predetermined second communication manner different from the first communication manner;

a storage unit which stores identification information for specifying a communication destination in association with a person to communicate with;

an input reception unit which receives from a user an instruction input for designating the person to communicate with;

a communication control unit which reads out, from plural pieces of identification information stored in association with the person to communicate with, who is indicated by the instruction input received by the input reception unit, identification information of a first communication destination of the person to communicate with and identification information of a second communication destination that is different from the first communication destination, when communication with the person to communicate with is to be carried out; and controls the first communication unit to send a communication request call by using the read-out identification information of the first communication destination and controls the second communication unit to send a communication request call by using the read-out identification information of the second communication destination in parallel with sending of the communication request call by the first communication unit; and a display unit which displays the person to communicate with indicated by the instruction input received by the input reception unit, and information indicating whether the person to communicate with has answered the communication request calls sent by the first communication unit and the second communication unit.

3. The communication terminal apparatus according to claim 2, wherein the storage unit further stores information indicating a communication manner in association with each of the identification information of the first communication destination and the identification information of the second communication destination, the display unit acquires the information indicating the communication manner associated with the identification information of the first communication destination from the storage unit, and displays the acquired information indicating the communication manner and information indicating whether the person to communicate with has answered the communication request call sent by the first communication unit, and the display unit acquires the information indicating the communication manner associated with the identification information of the second communication destination from the storage unit, and displays the acquired information indicating the communication manner and information indicating whether the person to communicate with has answered the communication request call sent by the second communication unit.

4. The communication terminal apparatus according to claim 2, wherein the display unit further displays information indicating that the communication request call is being sent, when the first communication unit or the second communication unit is sending the communication request call, and the display unit further displays information indicating that communication is being carried out, when the first communication unit or the second communication unit is communicating with the person to communicate with.

5. The communication terminal apparatus according to claim 1, wherein the storage unit further stores setting information indicating whether or not the identification information is to be used for parallel sending of communication request calls by the communication control unit, in association with each identification information, and the communication control unit reads out the identification information of the first communication destination and the identification information of the second communication destination, which are set by the setting information to be used for parallel sending by the communication control unit, from pieces of identification information associated with the person to communicate with indicated by the instruction input received by the input reception unit.

6. The communication terminal apparatus according to claim 1, further comprising a timer unit which keeps time, wherein the storage unit further stores an allowance period indicating a period of time in which the first communication unit or the second communication unit is allowed to send a communication request call to the person to communicate with by using the identification information of the first communication destination or the second communication destination, in association with each identification information, the communication control unit acquires a present time kept by the timer unit, and reads out the identification information of the first communication destination and the identification information of the second communication destination, with which the allowance period which includes the acquired present time therewithin is associated, from pieces of identification information associated with the person to communicate with indicated by the instruction input received by the input reception unit.

7. The communication terminal apparatus according to claim 1, wherein the communication control unit comprises:

a determination unit which determines whether or not a person to communicate with has answered communication request calls sent by the first communication unit and the second communication unit; and a communication request call invalidating unit which invalidates a communication request call which is determined by the determination unit as not having been answered by the person to communicate with.

8. The communication terminal apparatus according to claim 7, wherein the communication control unit further comprises a message information sending unit which, when the communication request call invalidating unit invalidates the communication request call sent by the first communication unit or the second communication unit, sends predetermined message information to the person to communicate with, to whom the communication request call by the first communication unit or the second communication unit, that is invalidated, has been sent.

9. The communication terminal apparatus according to claim 1, further comprising:
   a mixing unit which mixes a sound signal from the first communication destination output by the first communication unit and a sound signal from the second communication destination output by the second communication unit, when the communication request calls sent by the first communication unit and the second communication unit are both answered at the first communication destination and the second communication destination respectively; and
   a sound output unit which outputs a sound based on the sound signals mixed by the mixing unit.

10. The communication terminal apparatus according to claim 9, wherein the communication control unit comprises a communication disconnecting unit which receives an instruction input for selecting either the first communication destination or the second communication destination when the communication request calls sent by the first communication unit and the second communication unit are both answered at the first communication destination and the second communication destination respectively, and disconnects communication by the first communication unit or the second communication unit based on the received instruction input.

11. The communication terminal apparatus according to claim 1, wherein the storage unit stores the identification information by using at least one or more of a phone number, an e-mail address, an IP address, and a MAC address.

12. The communication terminal apparatus according to claim 1, wherein if only one piece of identification information is read out, the communication control unit controls any of the first communication unit and the second communication unit, that performs communication in the communication manner associated with the read-out identification information, to send a communication request call.

13. The communication terminal apparatus according to claim 7, wherein the communication control unit maintains communication in a communication manner used for sending a communication request call determined by the determination unit as having been first answered by the person to communicate with, and controls any other communication request call than the communication request call determined by the determination unit as having been first answered by the person to communicate with to be invalidated by the communication request call invalidating unit.

14. The communication terminal apparatus according to claim 7, wherein the communication control unit maintains communication in a communication manner used for sending a communication request call determined by the determination unit as having been first answered by the person to communicate with, and keeps any other communication request call than the communication request call determined by the determination unit as having been first answered by the person to communicate with alive until an instruction input for invalidating the any other communication request call is received from a user.

15. A communication method, comprising:
   a reception step of receiving from a user an instruction input for designating a person to communicate with;
   a reading step of, when an instruction input for designating the person to communicate with is received at the reception step, reading out identification information of a first communication destination of the person to communicate with and identification information of a second communication destination that is different from the first communication destination, from a storage unit which pre-stores information indicating a plurality of communication destinations of the person to communicate with; and
   a communication controlling step of controlling a communication request call to be sent to the first communication destination read out at the reading step with use of a predetermined first communication manner, and in parallel with sending of the communication request call by the first communication manner, controlling a communication request call to be sent to the second communication destination read out at the reading step with use of a second communication manner different from the first communication manner,
   wherein at least one of the first communication manner and the second communication manner is a wireless communication manner,
   wherein the communication method further comprises a radio field intensity acquiring step of acquiring a radio field intensity of the wireless communication manner used by at least one of the first communication manner and the second communication manner, and
   wherein if pieces of identification information stored in the storage unit in association with the person to communicate with indicated by the instruction input received at the input reception unit include identification information associated with the wireless communication manner, identification information associated with the wireless communication manner which has a radio field intensity acquired at the radio field intensity acquiring step that is equal to or larger than a predetermined value is read out from the storage unit at the reading step.

16. A non-transitory computer-readable information recording medium encoded with a computer program executed by a computer that causes the computer to function as:
   a first communication unit which performs communication in a predetermined first communication manner;
   a second communication unit which performs communication in a predetermined second communication manner different from the first communication manner;
   a storage unit which stores plural pieces of identification information for specifying a communication destination, in association with a person to communicate with, and stores information indicating a communication manner in association with each of the plural pieces of identification information;
   an input reception unit which receives from a user an instruction input for designating the person to communicate with; and
   a communication control unit which reads out, from the plural pieces of identification information stored in association with the person to communicate with, who is indicated by the instruction input received by the input reception unit, identification information of a first communication destination of the person to communicate with and identification information of a second communication destination that is different from the first communication destination from the storage unit when communication with the person to communicate with is to be carried out; and controls the first communication unit to send a communication request call by using the read-out identification information of the first communication destination and controls the second communication unit to send a communication request call by using the read-out identification information of the second communication destination in parallel with sending of the communication request call by the first communication unit, wherein at least one of the first communication unit and the second communication unit performs communication in a wireless communication manner, wherein the communication terminal apparatus further comprises a radio field intensity acquiring unit which acquires a radio field intensity of the wireless communication manner used by at least one of the first communication unit and the second communication unit, and wherein if pieces of identification information associated with the person to communicate with indicated by the instruction input received by the input reception unit include identification information associated with the wireless communication manner, the communication control unit reads out identification information associated with the wireless communication manner which has a radio field intensity acquired by the radio field intensity acquiring unit that is equal to or larger than a predetermined value.

* * * * *